United States Patent
Murray et al.

(10) Patent No.: US 10,078,660 B2
(45) Date of Patent: Sep. 18, 2018

(54) METHODS AND SYSTEMS FOR PRESENTING ONLINE CONTENT ELEMENTS BASED ON INFORMATION KNOWN TO A SERVICE PROVIDER

(75) Inventors: Sean MacLean Murray, Toronto (CA); Stèphane Maxime François Fortier, Breakeyville (CA); Jean Bouchard, Sillery (CA)

(73) Assignee: BCE INC., Verdun (CA)

( * ) Notice: Subject to any disclaimer, the term of this patent is extended or adjusted under 35 U.S.C. 154(b) by 1105 days.

(21) Appl. No.: 12/292,750

(22) Filed: Nov. 25, 2008

(65) Prior Publication Data
US 2009/0089357 A1 Apr. 2, 2009

Related U.S. Application Data

(63) Continuation of application No. PCT/CA2007/001921, filed on Oct. 26, 2007.
(Continued)

(51) Int. Cl.
*H04L 12/911* (2013.01)
*G06F 17/30* (2006.01)
(Continued)

(52) U.S. Cl.
CPC ....... *G06F 17/30386* (2013.01); *G06Q 20/02* (2013.01); *G06Q 20/10* (2013.01);
(Continued)

(58) Field of Classification Search
CPC ............. G06F 17/30386; H04W 4/023; H04L 63/0892; H04L 67/10; G06Q 40/00;
(Continued)

(56) References Cited

U.S. PATENT DOCUMENTS 5,903,721 A 5/1999 Sixtus
5,903,878 A 5/1999 Talati et al.
(Continued)

FOREIGN PATENT DOCUMENTS

CA 2 315 308 A1 9/2001
CA 2 413 340 A1 5/2004
(Continued)

OTHER PUBLICATIONS http://www.ip2location.com/ip-country-region-city-latitude-longitude-zipcode.aspx, Copyright 2001-2008 IP2Location.com, Feb. 7, 2008, 3 pages.
(Continued)

*Primary Examiner* — Scott B Christensen

(57) ABSTRACT

Methods and systems for presenting online content elements based on information known to a service provider. One of the methods is a method for presenting online content at a communication apparatus, the communication apparatus being assigned an identifier. The method comprises: obtaining information that pertains to a profile associated with the identifier and provided by a service provider involved in assigning the identifier to the communication apparatus; determining an online content element to be presented at the communication apparatus based on the information; and causing the communication apparatus to present the online content element. Another one of the methods is a method for facilitating determination of online content to be presented at a communication apparatus. Servers for implementing the methods are also provided.

21 Claims, 7 Drawing Sheets

Related U.S. Application Data

(60) Provisional application No. 60/941,830, filed on Jun. 4, 2007.

(51) Int. Cl.

| | | |
|---|---|---|
| *G06Q 20/02* | (2012.01) | |
| *G06Q 20/10* | (2012.01) | |
| *G06Q 20/40* | (2012.01) | |
| *G06Q 30/02* | (2012.01) | |
| *G06Q 40/00* | (2012.01) | |
| *H04L 29/08* | (2006.01) | |
| *H04L 29/06* | (2006.01) | |
| *H04W 4/02* | (2018.01) | |

(52) U.S. Cl.
CPC .......... *G06Q 20/40* (2013.01); *G06Q 30/0254* (2013.01); *G06Q 30/0264* (2013.01); *G06Q 40/00* (2013.01); *G06Q 40/12* (2013.12); *H04L 63/0892* (2013.01); *H04L 67/10* (2013.01); *H04W 4/023* (2013.01)

(58) Field of Classification Search
CPC ........... G06Q 30/0264; G06Q 30/0254; G06Q 20/40; G06Q 20/10; G06Q 20/02
USPC ...... 709/217, 218, 223, 224, 225; 705/14.73
See application file for complete search history.

(56) References Cited

U.S. PATENT DOCUMENTS

| | | | |
|---|---|---|---|
| 6,029,150 A | | 2/2000 | Kravitz |
| 6,041,353 A | | 3/2000 | Hirata et al. |
| 6,169,890 B1 | | 1/2001 | Vatanen |
| 6,339,761 B1 | | 1/2002 | Cottingham |
| 6,484,148 B1 * | 11/2002 | Boyd ................. 705/14.64 |
| 6,487,538 B1 | | 11/2002 | Gupta et al. |
| 6,700,965 B1 | | 3/2004 | Ferrer et al. |
| 6,836,765 B1 | | 12/2004 | Sussman |
| 6,859,791 B1 | | 2/2005 | Spagna et al. |
| 6,895,387 B1 | | 5/2005 | Roberts et al. |
| 6,957,393 B2 | | 10/2005 | Fano et al. |
| 7,111,789 B2 | | 9/2006 | Rjasekaran et al. |
| 7,292,996 B2 | | 11/2007 | Nobrega et al. |
| 7,359,869 B1 | | 4/2008 | Ananda |
| 7,411,905 B2 | | 8/2008 | Cook et al. |
| 7,630,939 B1 | | 12/2009 | Kolls |
| 7,665,658 B2 | | 2/2010 | Fields |
| 7,778,935 B2 | | 8/2010 | Colella |
| 7,818,229 B2 | | 10/2010 | Imrey et al. |
| 7,827,101 B2 | | 11/2010 | Mascavage |
| 7,827,108 B2 | | 11/2010 | Perlman et al. |
| 7,941,370 B2 | | 5/2011 | Paulsen |
| 7,983,961 B1 | | 7/2011 | Chang et al. |
| 8,032,536 B2 | | 10/2011 | Wu |
| 8,041,717 B2 | | 10/2011 | Ramer et al. |
| 8,045,956 B2 | | 10/2011 | Sun et al. |
| 8,079,087 B1 * | 12/2011 | Spies ................. G06F 17/30873 |
| | | | 709/205 |
| 8,321,278 B2 | | 11/2012 | Haveliwala et al. |
| 8,510,189 B2 | | 8/2013 | Imrey et al. |
| 8,566,237 B2 | | 10/2013 | Forzley |
| 2001/0053999 A1 | 12/2001 | Feinberg |
| 2002/0010747 A1 | 1/2002 | Jaehyuk-Hwang |
| 2002/0019831 A1 | 2/2002 | Wade |
| 2002/0035622 A1 | 3/2002 | Barber |
| 2002/0069176 A1 | 6/2002 | Newman |
| 2002/0077837 A1 | 6/2002 | Krueger et al. |
| 2002/0107981 A1 | 8/2002 | Moore et al. |
| 2002/0143655 A1 | 10/2002 | Elston et al. |
| 2002/0156984 A1* | 10/2002 | Padovano ............ G06F 11/201 |
| | | | 711/148 |
| 2002/0161701 A1 | 10/2002 | Warmack |
| 2003/0023489 A1 | 1/2003 | McGuire et al. |
| 2003/0041240 A1 | 2/2003 | Roskind et al. |
| 2003/0105710 A1 | 6/2003 | Barbara et al. |
| 2003/0140120 A1 | 7/2003 | Hartman |
| 2003/0172036 A1 | 9/2003 | Feigenbaum |
| 2003/0187949 A1 | 10/2003 | Bhatt et al. |
| 2004/0006489 A1 | 1/2004 | Bynon |
| 2004/0049574 A1* | 3/2004 | Watson ............ G06F 17/30905 |
| | | | 709/224 |
| 2004/0102197 A1 | 5/2004 | Dietz |
| 2004/0205004 A1 | 10/2004 | Bahl et al. |
| 2004/0250236 A1 | 12/2004 | O'Malley et al. |
| 2005/0021853 A1 | 1/2005 | Parekh et al. |
| 2005/0066339 A1 | 3/2005 | Thoen |
| 2005/0108177 A1 | 5/2005 | Sancho |
| 2005/0144073 A1 | 6/2005 | Morrisroe et al. |
| 2005/0165684 A1 | 7/2005 | Jensen et al. |
| 2005/0177562 A1* | 8/2005 | Raciborski ................. 707/3 |
| 2005/0190901 A1 | 9/2005 | Oborn et al. |
| 2005/0260973 A1 | 11/2005 | Van de Groenendaal |
| 2006/0020508 A1 | 1/2006 | Gorti et al. |
| 2006/0059044 A1 | 3/2006 | Chan et al. |
| 2006/0080147 A1 | 4/2006 | Greenstein |
| 2006/0085263 A1 | 4/2006 | Greer et al. |
| 2006/0085357 A1 | 4/2006 | Pizzaro |
| 2006/0111991 A1 | 5/2006 | Wilshinsky et al. |
| 2006/0116924 A1* | 6/2006 | Angles et al. ............ 705/14 |
| 2006/0123105 A1* | 6/2006 | Parekh et al. ............. 709/223 |
| 2006/0190287 A1 | 8/2006 | Forshaw et al. |
| 2006/0235795 A1 | 10/2006 | Johnson et al. |
| 2006/0271953 A1 | 11/2006 | Jacoby et al. |
| 2007/0050481 A1 | 3/2007 | Rigole |
| 2007/0067297 A1 | 3/2007 | Kublickis |
| 2007/0106660 A1 | 5/2007 | Seib et al. |
| 2007/0220604 A1 | 9/2007 | Long |
| 2007/0239546 A1* | 10/2007 | Blum et al. ................ 705/14 |
| 2008/0095173 A1* | 4/2008 | Bugenhagen ............ 370/395.21 |
| 2008/0104227 A1* | 5/2008 | Birnie .................... H04W 4/02 |
| | | | 709/224 |
| 2008/0164308 A1 | 7/2008 | Aaron et al. |
| 2008/0255944 A1* | 10/2008 | Shah et al. ................ 705/14 |
| 2009/0172033 A1 | 7/2009 | Clark et al. |
| 2010/0174660 A1 | 7/2010 | Clark et al. |
| 2010/0205652 A1 | 8/2010 | Bouchard et al. |
| 2011/0208663 A1 | 8/2011 | Kennis et al. |

FOREIGN PATENT DOCUMENTS

| | | |
|---|---|---|
| CA | 2689479 | 12/2008 |
| CA | 2689863 | 12/2008 |
| EP | 1 126 732 A2 | 8/2001 |
| WO | WO 99/62210 | 12/1999 |
| WO | WO 99/66436 | 12/1999 |
| WO | WO 00/31630 | 6/2000 |
| WO | WO 01/67313 A1 | 9/2001 |
| WO | WO02/49257 | 6/2002 |
| WO | PCT/CA2007/001865 | 2/2008 |
| WO | PCT/CA2007/001921 | 2/2008 |
| WO | PCT/CA2007/001152 | 3/2008 |
| WO | PCT/CA2007/001802 | 3/2008 |
| WO | PCT/CA2007/002119 | 3/2008 |
| WO | PCT/CA2007/002188 | 3/2008 |
| WO | PCT/CA2007/001921 | 3/2009 |
| WO | PCT/CA2007/001152 | 4/2009 |
| WO | PCT/CA2007/002188 | 4/2009 |

OTHER PUBLICATIONS http://www.location.com.my/, IP2Location.com Copyright 2001-2007, Feb. 7, 2008, 11 pages.

James A. Muir et al., Internet Geolocation and Evasion, School of Computer Science, Carleton University, Ottawa, Canada, Apr. 8, 2006, 22 pages.

J. Peterson, A Presence-based GEOPRIV Location Object Format, Internet Engineering Task Force (IETF), RFC 4119, Dec. 2005, 22 pages.

Non-Final Office Action issued by the United States Patent and Trademark Office dated Jun. 24, 2011 in connection with U.S. Appl. No. 12/298,720, 10 pages.

(56) References Cited

OTHER PUBLICATIONS

Non-Final Office Action issued by the United States Patent and Trademark Office dated Aug. 8, 2011 in connection with U.S. Appl. No. 12/087,427, 7 pages.
Non-Final Office Action issued by the United States Patent and Trademark Office dated May 26, 2011 in connection with U.S. Appl. No. 12/227,709, 21 pages.
Non-Final Office Action issued by the United States Patent and Trademark Office dated Jun. 21, 2011 in connection with U.S. Appl. No. 12/162,297, 5 pages.
Office Action dated Oct. 24, 2011 in connection with U.S. Appl. 12/224,506, 26 pages.
Office Action dated Oct. 25, 2011 in connection with U.S. Appl. 12/226,880, 41 pages.
Office Action dated Nov. 14, 2011 in connection with U.S. Appl. No. 12/087,427, 9 pages.
Office Action dated Nov. 30, 2011 in connection with U.S. Appl. No. 12/162,297, 11 pages.
Office Action dated Dec. 28, 2011 in connection with U.S. Appl. No. 12/227,709, 32 pages.
Office Action dated Dec. 7, 2011 in connection with U.S. Appl. No. 12/298,720, 21 pages.
Final Office Action issued by the United States Patent and Trademark Office dated Jul. 3, 2013 in connection with U.S. Appl. No. 12/292,745, 11 pages.
Final Office Action issued by the United States Patent and Trademark Office dated Jul. 18, 2013 in connection with U.S. Appl. No. 12/314,735, 22 pages.
Images captured by www.archive.org ("the wayback machine"); snapshots of that http://www.ip2location.com; dated prior to May 30, 2007; referred to as ip2location, labeled pp. C-F attached.
Examiner's Report dated Jul. 9, 2012 in connection with Canadian Patent Application 2,654,400, 7 pages.
Examiner's Report dated Jul. 26, 2012 in connection with Canadian Patent Application 2,689,072, 5 pages.
Examiner's Report dated Jul. 25, 2012 in connection with Canadian Patent Application 2,633,227, 4 pages.
Advisory Action dated Aug. 30, 2012 in connection with U.S. Appl. No. 12/224,506, 3 pages.
Examiner's Report dated Jul. 18, 2012 in connection with Canadian Patent Application 2,690,090, 5 pages.
Examiner's Report dated Jul. 18, 2012 in connection with Canadian Patent Application 2,690,030, 6 pages.
Examiner's Report dated Jul. 18, 2012 in connection with Canadian Patent Application 2,689,479, 6 pages.
Office Action dated Aug. 29, 2012 in connection with U.S. Appl. No. 12/292,745, 13 pages.
Final Office Action issued by the United States Patent and Trademark Office dated Sep. 13, 2012 in connection with U.S. Appl. No. 12/602,236, 23 pages.
Non-Final Office Action issued by the United States Patent and Trademark Office dated Nov. 15, 2012 in connection with U.S. Appl. No. 12/226,880, 27 pages.
Examiner's Answer in Response to Appeal Brief issued by the United States Patent and Trademark Office dated Dec. 20, 2012 in connection with U.S. Appl. No. 12/298,720, 10 pages.
Non-Final Office Action issued by the United States Patent and Trademark Office dated Jan. 31, 2013 in connection with U.S. Appl. No. 12/314,735, 21 pages.
Non-Final Office Action issued by the United States Patent and Trademark Office dated Feb. 15, 2013 in connection with U.S. Appl. No. 12/292,745, 9 pages.
IP2Location.com, "IP2Location.com Releases New Mar. 2007 Geolocation Database", PRLog (Press Release), Feb. 28, 2007, Bradenton, FL, 4 pages.
Non-Final Office Action issued by the United States Patent & Trademark Office dated Feb. 29, 2012 in connection with U.S. Appl. No. 12/602,236, 42 pages.
Final Office Action issued by the United States Patent & Trademark Office dated Apr. 18, 2012 in connection with U.S. Appl. No. 12/224,506, 14 pages.
Final Office Action issued by the United States Patent & Trademark Office dated May 3, 2012 in connection with U.S. Appl. No. 12/226,880, 26 pages.
Examiner's Report dated May 21, 2014 in connection with Canadian Patent Application 2,689,863, 4 pages.
Non-Final Office Action issued by the United States Patent and Trademark Office dated Nov. 20, 2013 in connection with U.S. Appl. No. 12/226,880, 40 pages.
Final Office Action issued by the United States Patent and Trademark Office dated Sep. 24, 2013 in connection with U.S. Appl. No. 12/224,506, 12 pages.
Office Action dated Jun. 3, 2014 in connection with U.S. Appl. No. 12/087,427, 9 pages.

* cited by examiner

METHODS AND SYSTEMS FOR PRESENTING ONLINE CONTENT ELEMENTS BASED ON INFORMATION KNOWN TO A SERVICE PROVIDER

CROSS-REFERENCE TO RELATED APPLICATION

This application is a continuation, and claims the benefit under 35 USC 120, of International Application PCT/CA2007/001921 filed on Oct. 26, 2007 and hereby incorporated by reference herein, which claims priority from U.S. Provisional Patent Application No. 60/941,830 filed on Jun. 4, 2007 and hereby incorporated by reference herein.

FIELD OF THE INVENTION

The present invention relates generally to online content presented at a communication apparatus connected to a computer network such as the Internet, and, more particularly, to methods and systems for presenting online content elements based on information known to a service provider.

BACKGROUND

When using a communication apparatus to access and interact with various network sites of a computer network such as the Internet, a user is presented with a wide variety of online content. For example, in addition to primary content of a network site being accessed, the user is often presented with advertising content that provides one or more online advertisements.

In order to improve their effectiveness, online advertisements presented to a user are typically targeted using various techniques that take into account different factors, such as online behavior of the user (i.e., behavioral targeting), a geographic location (e.g., a country or city) of the user, or the primary content of an accessed network site (i.e., contextual targeting). Although existing techniques are useful to some extent, their degree of advertisement targeting is limited by information that they use in determining which ads to present to users. In particular, since they are typically confined to using information that is derived from online activities of users (e.g., browsing histories, search engine queries, etc.) and/or that is insufficiently precise or specific (e.g., in terms of geographic location of users), existing ad targeting techniques are limited in their ability to precisely target ads to users.

Limitations similar to those imposed on existing ad targeting techniques are often imposed on techniques used to tailor or otherwise determine elements of primary content of a network site that are to be presented to a user. As such, in some cases, elements of primary content of a network site that are to be presented to a user may not be tailored or customized as precisely as the network site's operator may want, possibly adversely affecting the user's experience in visiting the network site.

For these and other reasons, there is a need for methods and systems that enable more precise targeting or tailoring of online advertisements or other online content elements that are presented to users.

SUMMARY OF THE INVENTION

In accordance with a first broad aspect, the present invention provides a method for presenting online content at a communication apparatus, the communication apparatus being assigned an identifier. The method comprises: obtaining information that pertains to a profile associated with the identifier and provided by a service provider involved in assigning the identifier to the communication apparatus; determining an online content element to be presented at the communication apparatus based on the information; and causing the communication apparatus to present the online content element.

In accordance with a second broad aspect, the present invention provides a server for presenting online content at a communication apparatus, the communication apparatus being assigned an identifier. The server comprises an interface for receiving and sending data and a processing unit coupled to the interface. The processing unit is operative for: obtaining information that pertains to a profile associated with the identifier and provided by a service provider involved in assigning the identifier to the communication apparatus; determining an online content element to be presented at the communication apparatus based on the information; and causing the communication apparatus to present the online content element.

In accordance with a third broad aspect, the present invention provides a computer-readable medium storing a program component for execution by a computer system to present online content at a communication apparatus, the communication apparatus being assigned an identifier. The program component comprises: first program code for causing the computer system to obtain information that pertains to a profile associated with the identifier and provided by a service provider involved in assigning the identifier to the communication apparatus; second program code for causing the computer system to determine an online content element to be presented at the communication apparatus based on the information; and third program code for causing the computer system to cause the communication apparatus to present the online content element.

In accordance with a fourth broad aspect, the present invention provides a method for facilitating determination of online content to be presented at a communication apparatus. The method comprises: obtaining an identifier assigned to the communication apparatus; consulting a profile associated with the identifier and provided by a service provider involved in assigning the identifier to the communication apparatus; and transmitting information pertaining to the profile to a network component to allow the network component to determine an online content element to be presented at the communication apparatus based on the information.

In accordance with a fifth broad aspect, the present invention provides a server for facilitating determination of online content to be presented at a communication apparatus. The server comprises an interface for receiving and sending data and a processing unit coupled to the interface. The processing unit is operative for: obtaining an identifier assigned to the communication apparatus; consulting a profile associated with the identifier and provided by a service provider involved in assigning the identifier to the communication apparatus; and transmitting information pertaining to the profile to a network component to allow the network component to determine an online content element to be presented at the communication apparatus based on the information.

In accordance with a sixth broad aspect, the present invention provides a computer-readable medium storing a program component for execution by a computer system to facilitate determination of online content to be presented at a communication apparatus. The program component comprises: first program code for causing the computer system to obtain an identifier assigned to the communication apparatus; second program code for causing the computer system to consult a profile associated with the identifier and provided by a service provider involved in assigning the identifier to the communication apparatus; and third program code for causing the computer system to transmit information pertaining to the profile to a network component to allow the network component to determine an online content element to be presented at the communication apparatus based on the information.

In accordance with a seventh broad aspect, the present invention provides a method for presenting online advertising content at a communication apparatus. The method comprises: obtaining a service point location that is associated with an identifier assigned to the communication apparatus; determining an online advertisement to be presented at the communication apparatus based on the service point location; and causing the communication apparatus to present the online advertisement.

In accordance with an eighth broad aspect, the present invention provides a server for presenting online advertising content at a communication apparatus. The server comprises an interface for receiving and sending data and a processing unit coupled to the interface. The processing unit is operative for: obtaining a service point location that is associated with an identifier assigned to the communication apparatus; determining an online advertisement to be presented at the communication apparatus based on the service point location; and causing the communication apparatus to present the online advertisement.

In accordance with a ninth broad aspect, the present invention provides a method for facilitating determination of online advertising content to be presented at a communication apparatus. The method comprises: obtaining an identifier assigned to the communication apparatus; consulting a database to obtain a service point location associated with the identifier; and transmitting the service point location to a network component to allow the network component to determine an online advertisement to be presented at the communication apparatus based on the service point location.

In accordance with a tenth broad aspect, the present invention provides a server for facilitating determination of online advertising content to be presented at a communication apparatus. The server comprises an interface for receiving and sending data and a processing unit coupled to the interface. The processing unit is operative for: obtaining an identifier assigned to the communication apparatus; consulting a database to obtain a service point location associated with the identifier; and transmitting the service point location to a network component to allow the network component to determine an online advertisement to be presented at the communication apparatus based on the service point location.

These and other aspects of the invention will become apparent to those of ordinary skill in the art upon review of the following description of embodiments of the invention in conjunction with the accompanying drawings.

BRIEF DESCRIPTION OF THE DRAWINGS

A detailed description of embodiments of the present invention is provided herein below, by way of example only, with reference to the accompanying drawings, in which.

It is to be expressly understood that the description and drawings are only for purposes of illustration of example embodiments of the present invention and are an aid for understanding. They are not intended to be a definition of the limits of the invention.

DETAILED DESCRIPTION OF EMBODIMENTS

Figure 1:
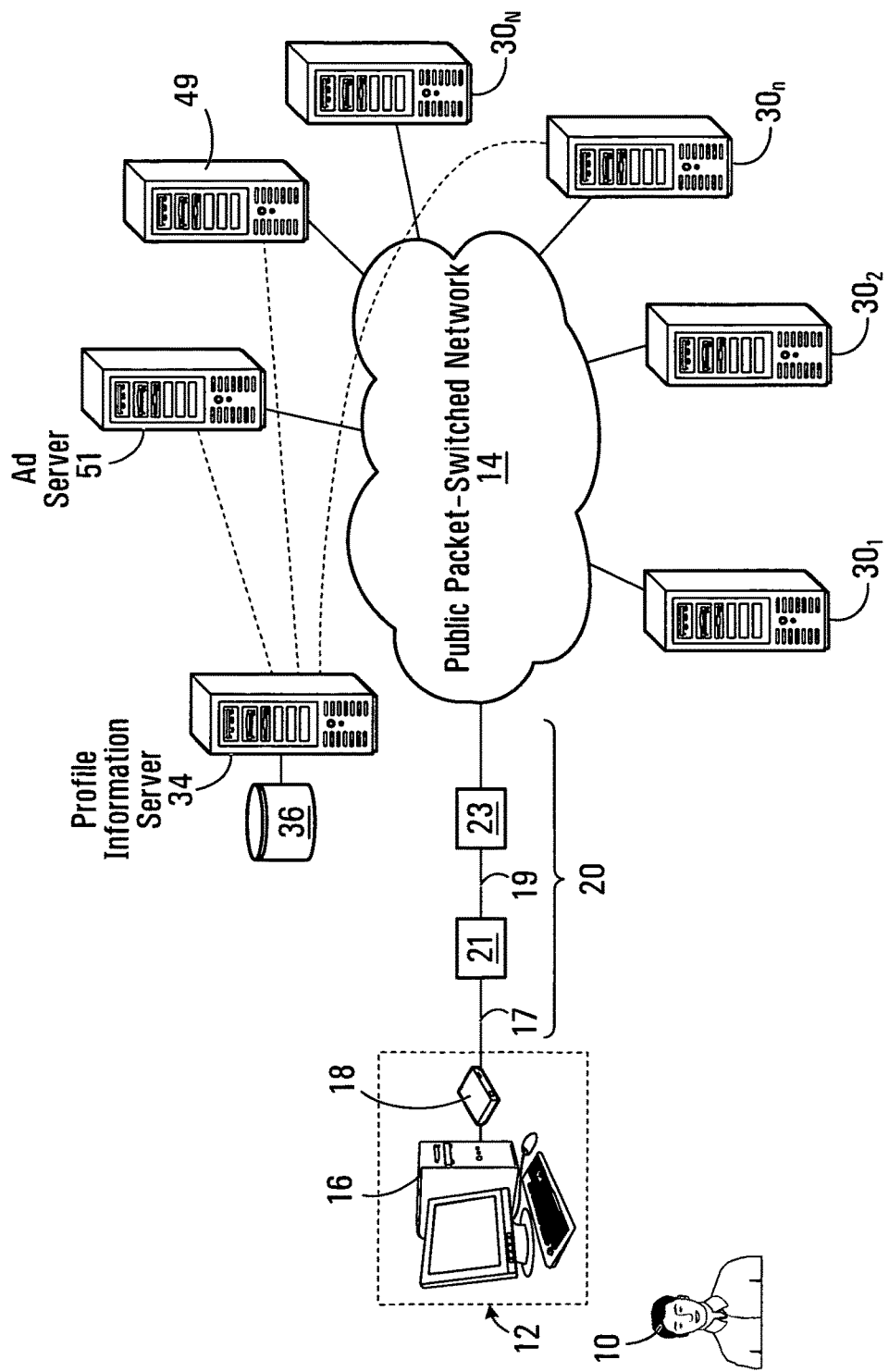
FIG. 1 shows an architecture allowing a user of a communication apparatus connected to a public packet-switched network to access and interact with network sites of that network, in accordance with an embodiment of the present invention.

FIG. 1 depicts an architecture allowing a user 10 of a communication apparatus 12 connected to a public packet-switched network 14 (e.g., the Internet) to access and interact with network sites (e.g., web sites) of the network 14, in accordance with an embodiment of the present invention.

In this embodiment, the communication apparatus 12 comprises a computing device 16 and a network interface unit 18. For example, the computing device 16 may be implemented as a personal computer (PC) such as a desktop computer, a laptop computer, or a tablet PC. The computing device 16 is provided with at least one input device such as a keyboard, a mouse, a touchscreen, a stylus, a microphone, etc., as well as a display and possibly one or more other output devices (e.g., speakers) that enable interaction between the user 10 and the computing device 16. The computing device 16 is operative to run a software application implementing a network browser (e.g., a web browser) with which the user 10 can interact via the display (and possibly one or more other output devices) and the at least one input device in order to access and interact with network sites of the public packet-switched network 14.

The network interface unit 18 enables the communication apparatus 12 to exchange data with the public packet-switched network 14 via a communication link 20. For example, in various embodiments, and depending on the nature of the communication link 20, the network interface unit 18 may be implemented as a modem such as a broadband modem (e.g., a digital subscriber line (DSL) modem or a cable modem) or a narrowband modem (e.g., a dial-up modem). Although it is shown as being a separate component in FIG. 1, the network interface unit 18 may be integrated into the computing device 16 (e.g., it may be a card internal to the computing device 16).

The communication link 20 may traverse one or more network components and comprise one or more physical links and one or more logical links. For example, the communication link 20 may comprise a physical link 17 between the network interface unit 18 and a network component 21. The physical link 17 may comprise a copper twisted pair, a coax cable, an Ethernet link, a fiber optic link (e.g., fiber to the premises (FTTP)), a wireless link, a satellite link, or a combination thereof. Depending on the nature of the physical link 17, the network component 21 may be a DSL access multiplexer (DSLAM), a cable modem termination system (CMTS), or another type of network component. The communication link 20 may also comprise a dedicated logical link 19 between the network component 21 and another network component 23 that provides access to the public packet-switched network 14. For instance, the network component 23 may be a network access server (NAS), a router, etc. It will be appreciated that the communication link 20 may take on many forms in various embodiments.

While in this embodiment the communication apparatus 12 comprises the computing device 16 and the network interface unit 18, it will be appreciated that the communication apparatus 12 may comprise other components in other embodiments.

In order to exchange data with the public packet-switched network 14, the communication apparatus 12 is assigned a logical identifier. The logical identifier, which may be assigned to the computing device 16 or the network interface unit 18, may be an Internet Protocol (IP) address (e.g., in compliance with IPv4 or IPv6) or a proprietary address. The logical identifier may be statically assigned to the communication apparatus 12 in which case it does not change over time (e.g., a static IP address). Alternatively, the logical identifier may be dynamically assigned to the communication apparatus 12 in which case it may change over time (e.g., a dynamic IP address).

The logical identifier may be assigned to the communication apparatus 12 by a network component that is part of the communication link 20 (e.g., the network component 23 in embodiments where it is a network access server). This network component may assign the logical identifier to the communication apparatus 12 when the communication apparatus 12 is activated (e.g., when the network interface unit 18 and/or the computing device 16 is/are powered-up) or otherwise regains network connectivity and/or at certain time intervals which may range from an hour or less to several months or more. For instance, in embodiments where the logical identifier is a dynamic IP address, the network component assigning the dynamic IP address to the communication apparatus 12 may do so in accordance with the Dynamic Host Configuration Protocol (DHCP) using a pool of IP addresses accessible to that network component. It will be recognized that assignment of the logical identifier to the communication apparatus 12 may be effected in various ways in various embodiments.

As mentioned previously, the user 10 can use the communication apparatus 12 to access and interact with network sites of the public packet-switched network 14. These network sites are implemented by servers $30_1 \ldots 30_N$ connected to the public packet-switched network 14. The servers $30_1 \ldots 30_N$ and the network sites that they implement are operated, managed or otherwise associated with various entities, including, for example, corporations, governmental organizations, non-profit organizations, and individuals.

Each of the servers $30_1 \ldots 30_N$ comprises suitable hardware, firmware, software, control logic, or a combination thereof for implementing a plurality of functional elements, including an interface and a processing unit. The interface of each of the servers $30_1 \ldots 30_N$ is adapted to receive and send data (e.g., in the form of messages) from and to communication apparatuses (such as the communication apparatus 12) connected to the public packet-switched network 14 as well as other components (e.g., computers or databases) communicatively coupled to that server but not necessarily connected to the network 14. The processing unit of each of the servers $30_1 \ldots 30_N$ is adapted to effect various processing operations to implement that server's functionality.

When the user 10 uses the communication apparatus 12 to access a network site implemented by a server $30_n$ ($1 \leq n \leq N$), the network browser implemented by the computing device 16 interacts with the server $30_n$ in order to allow the user 10 to view, hear or otherwise be presented with online content via the display and/or one or more other output devices of the computing device 16. While interacting with the network site, the user 10 may also input information (e.g., by entering text, selecting an option, etc.) and/or one or more commands (e.g., by clicking on a graphical button or a hyperlink) via the at least one input device of the computing device 16.

The online content presented to the user 10 when he/she accesses or interacts with the network site implemented by the server $30_n$ comprises various online content elements. An online content element can include any information visually and/or aurally presentable to the user 10 when he/she accesses or interacts with the network site. For example, an online content element may include text, one or more images, one or more videos, one or more sounds, one or more animations, one or more hyperlinks, one or more links to downloadable files, one or more interactive features (e.g., games, maps, etc.), and/or other information that can be presented to the user 10 when he/she accesses or interacts with the network site. In some cases, an online content element may constitute an entire online page (e.g, web page), while in other cases it may constitute a portion (e.g., text, an image, a video, and/or sound) of such a page. Also, in some cases, an online content element may be part of a window containing a currently-displayed page of the network site, while in other cases it may be part of another window (e.g., a pop-up window) that is separate from the window containing the currently-displayed page of the network site.

Also, the online content presented to the user 10 when he/she accesses or interacts with the network site implemented by the server $30_n$ comprises primary content and possibly advertising content.

The primary content serves to provide a primary function of the network site implemented by the server $30_n$. For example: where the network site is a search engine site, the primary content serves to provide searching functionality and search results to the user 10; where the network site is a commercial site associated with a company, the primary content serves to provide information on the company or its products and/or services; where the network site is a personal site associated with a person, the primary content serves to provide information on the person; where the network site is a news site, the primary content serves to provide news; where the network site is a map and/or directions site, the primary content serves to provide maps and/or directions; etc.

The advertising content, if any, serves to provide one or more online advertisements. Each online advertisement is a paid online announcement designed to attract public attention to promote, for instance, an entity (e.g., a company or other organization), a product, a service, or an event. For example, an online advertisement may be a banner ad, a vertical banner ad, a skyscraper ad, a pop-up ad, a pop-under ad, an interstitial ad, a floating ad, an expanding ad, a trick banner ad, a video ad, or any other type of online ad.

Thus, online content elements presented to the user 10 when he/she accesses or interacts with the network site implemented by the server $30_n$ comprise one or more primary content elements, and possibly one or more advertising content elements forming one or more online advertisements.

Sometimes, while he/she uses the communication apparatus 12 to interact with the network site implemented by the server 30$_n$, the user 10 may click on a hyperlink that results in the communication apparatus 12 accessing a network site implemented by another one of the servers 30$_1$ . . . 30$_N$, in which case the network browser implemented by the computing device 16 interacts with the other one of the servers 30$_1$ . . . 30$_N$ in order to allow the user 10 to be presented with other online content that comprises other online content elements. Similarly, in some situations, upon accessing the network site implemented by the server 30$_n$, the server 30$_n$ may automatically redirect the communication apparatus 12 to access a network site implemented by another one of the servers 30$_1$ . . . 30$_N$, in which case the network browser implemented by the computing device 16 interacts with the other one of the servers 30$_1$ . . . 30$_N$ in order to allow the user 10 to be presented with other online content that comprises other online content elements.

Accordingly, as the user 10 uses the communication apparatus 12 to access and interact with network sites implemented by the servers 30$_1$ . . . 30$_N$, he/she is presented with various online content elements.

When the user 10 uses the communication apparatus 12 to access and interact with the network site implemented by the server 30$_n$, each of the online content elements presented at the communication apparatus 12 is determined and provided by the server 30$_n$, an ad server 51 associated with the server 30$_n$, or another network component 49 (e.g., a media server providing pictures, videos, audio clips, and/or other media) external to the server 30$_n$ but linked thereto or otherwise associated therewith. Communication between the communication apparatus 12 and the ad server 51 and/or the network component 49 may take place over a link established over the public packet-switched network 14 and possibly another network. Typically, the one or more primary content elements presented at the communication apparatus 12 are determined and provided by the server 30$_n$, although in certain cases one or more of these primary content elements may be determined and provided by the network component 49. For their part, the one or more advertising content elements (forming one or more online advertisements) presented at the communication apparatus 12, if any, are typically determined and provided by the ad server 51.

The ad server 51 comprises suitable hardware, firmware, software, control logic, or a combination thereof for implementing a plurality of functional elements, including an interface and a processing unit. The interface of the ad server 51 is adapted to receive and send data (e.g., in the form of messages) from and to servers, other computers and/or other components (e.g., databases). The processing unit of the ad server 51 is adapted to effect various processing operations to implement that server's functionality. Although it is shown as a component distinct from the server 30$_n$, in some embodiments, the ad server 51 may be managed by an entity operating the server 30$_n$. In particular, in some embodiments, the ad server 51 and the server 30$_n$ may be implemented by a common computing system.

Similarly, the network component 49 comprises suitable hardware, firmware, software, control logic, or a combination thereof for implementing a plurality of functional elements, including an interface and a processing unit. The interface of the network component 49 is adapted to receive and send data (e.g., in the form of messages) from and to servers, other computers and/or other components (e.g., databases). The processing unit of the network component 49 is adapted to effect various processing operations to implement that component's functionality.

With continued reference to FIG. 1, in accordance with an embodiment of the present invention, there is provided a network component 34, hereinafter referred to as a "profile information server", which can interact with the server 30$_n$, the ad server 51 and/or the network component 49 in order to facilitate determination of one or more online content elements to be presented at the communication apparatus 12 when the user 10 accesses or interacts with the network site implemented by the server 30$_n$. As further discussed below, the profile information server 34 allows information pertaining to a profile that is associated with the logical identifier assigned to the communication apparatus 12 to be used in order to determine one or more online content elements to be presented at the communication apparatus 12 when it is used by the user 10 to access or interact with the network site implemented by the server 30$_n$.

More particularly, the profile information server 34 has access to a profile information database 36. In some embodiments, the profile information server 34 and the profile information database 36 may be part of separate network components and communicatively coupled to one another via a communication link, which may traverse one or more network components and comprise one or more physical links and one or more logical links. In other embodiments, the profile information server 34 and the profile information database 36 may be part of a common network component. In yet other embodiments, the profile information database 36 may be distributed amongst a plurality of network components and/or physical locations.

Figure 2:
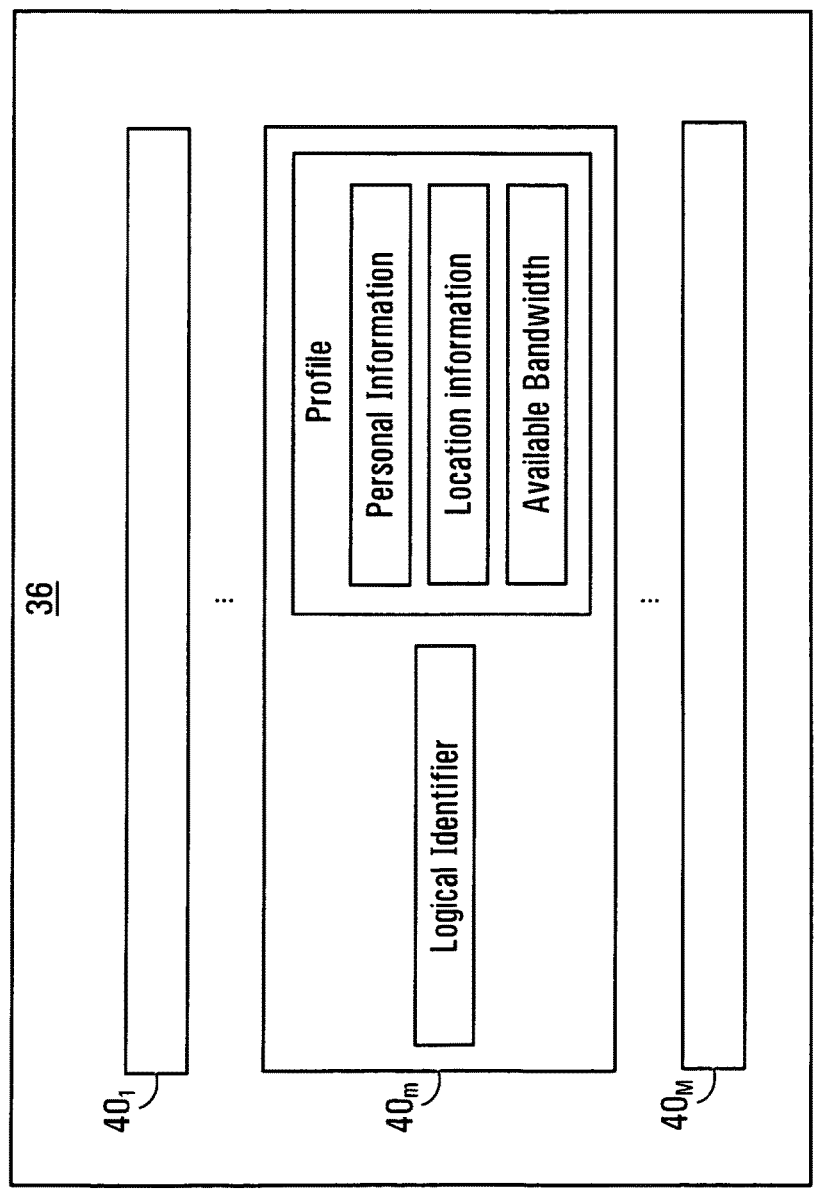
FIG. 2 shows an example of potential contents of a profile information database accessible to a profile information server of the architecture shown in FIG. 1.

Referring additionally to FIG. 2, there is shown an example of potential contents of the profile information database 36. In this example, the profile information database 36 stores a plurality of records 40$_1$ . . . 40$_M$. Each of the records 40$_1$ . . . 40$_M$ associates a profile to a logical identifier assigned to a communication apparatus (such as the logical identifier assigned to the communication apparatus 12).

The profile in a record 40$_m$ ($1 \leq m \leq M$) includes information known to a service provider involved in assigning the logical identifier that is associated with that profile. The service provider may be an access service provider (ASP, also sometimes called a regional access network provider (RANP)) that may or may not be an internet service provider (ISP). For example, the information in the record 40$_m$ may include one or more of:

Personal information regarding a party to which the service provider provides a network access service. For instance, this personal information may include a name, a gender, a date of birth or an age, a nationality, a correspondence language, a civic address (e.g., a residential or work address), a phone number (e.g., a residential, work, VoIP or mobile phone number), an email address, an instant messaging (IM) identifier, and/or financial information (e.g., credit or debit card information, bank account information, or other information used to pay for the network access service) of the party. Other personal information regarding the party may be included in the record. Also, in some cases, the party may be more than one person, in which cases the record 40$_m$ may include personal information regarding each such person. The personal information regarding the party may be included in the record 40$_m$ as a result of interaction between the party and the service provider (e.g., during a registration or service activation phase where the record $40_m$ is created).

Location information regarding the communication apparatus to which is assigned the logical identifier in the record $40_m$. This location information specifies a physical location of the communication apparatus to which is assigned the logical identifier in the record $40_m$ is located.

For example, in some embodiments, the location information may specify a location of a service point where the communication apparatus to which is assigned the logical identifier in the record $40_m$ is located. The "service point" refers to a physical point where the service provider provides a network access service to an end-user (such as the user 10) of the communication apparatus to which is assigned the logical identifier in the record $40_m$. For example, the service point may be a house or other building (or an area thereof). The location of the service point, which is hereinafter referred to as the "service point location", may be expressed as a civic address (e.g., a service address), a set of geo-coordinates, or any other information identifying where the service point is located.

In other embodiments, the location information may specify a current position of the communication apparatus to which is assigned the logical identifier in the record $40_m$, as detected or measured by other means (e.g., triangulation).

Still other forms of location information may be included in the record $40_m$ in other embodiments.

Presence information regarding a party to which the service provider provides a network access service. For instance, this presence information may include a presence state (e.g., online, offline, away, busy, etc.) indicative of an ability and willingness of the party to communicate. Also, in some cases, the party may be more than one person, in which cases the record $40_m$ may include presence information regarding each such person; and/or A bandwidth available to the communication apparatus to which is assigned the logical identifier in the record $40_m$.

This example of information potentially included in a profile is presented for illustrative purposes only and should not be considered limiting in any respect. Generally, a profile that is associated with a given logical identifier assigned to a communication apparatus can include any information known to a service provider involved in assigning the given logical identifier to the communication apparatus.

An example process by which the profile information database 36 may be populated is described later on. For now, suffice it to say that the profile information database 36 stores the records $40_1 \ldots 40_M$ that associate profiles to logical identifiers.

The profile information server 34 is operative to use information included in the profile information database 36 in order to assist the server $30_n$, the ad server 51 and/or the network component 49 in determining one or more online content elements to be presented at the communication apparatus 12 when it is used by the user 10 to access or interact with the network site implemented by the server $30_n$. To that end, the profile information server 34 comprises suitable hardware, firmware, software, control logic, or a combination thereof for implementing a plurality of functional elements, including an interface and a processing unit. The interface of the profile information server 34 is adapted to receive and send data (e.g., in the form of messages) from and to the server $30_n$, the ad server 51 and/or the network component 49, and possibly other servers, computers and/or other components (e.g., databases) communicatively coupled to the profile information server 34 via communication links (not shown) that may be established over the public packet-switched network 14 and/or another network and that may traverse one or more network components and comprise one or more physical links and one or more logical links. The processing unit of the profile information server 34 is adapted to effect various processing operations to implement that server's functionality.

Operation of, and interaction between, the profile information server 34, the server $30_n$, the ad server 51, and/or the network component 49 will now be illustrated in the context of an example where the user 10 uses the communication apparatus 12 to access and interact with the network site implemented by the server $30_n$.

Figure 3:
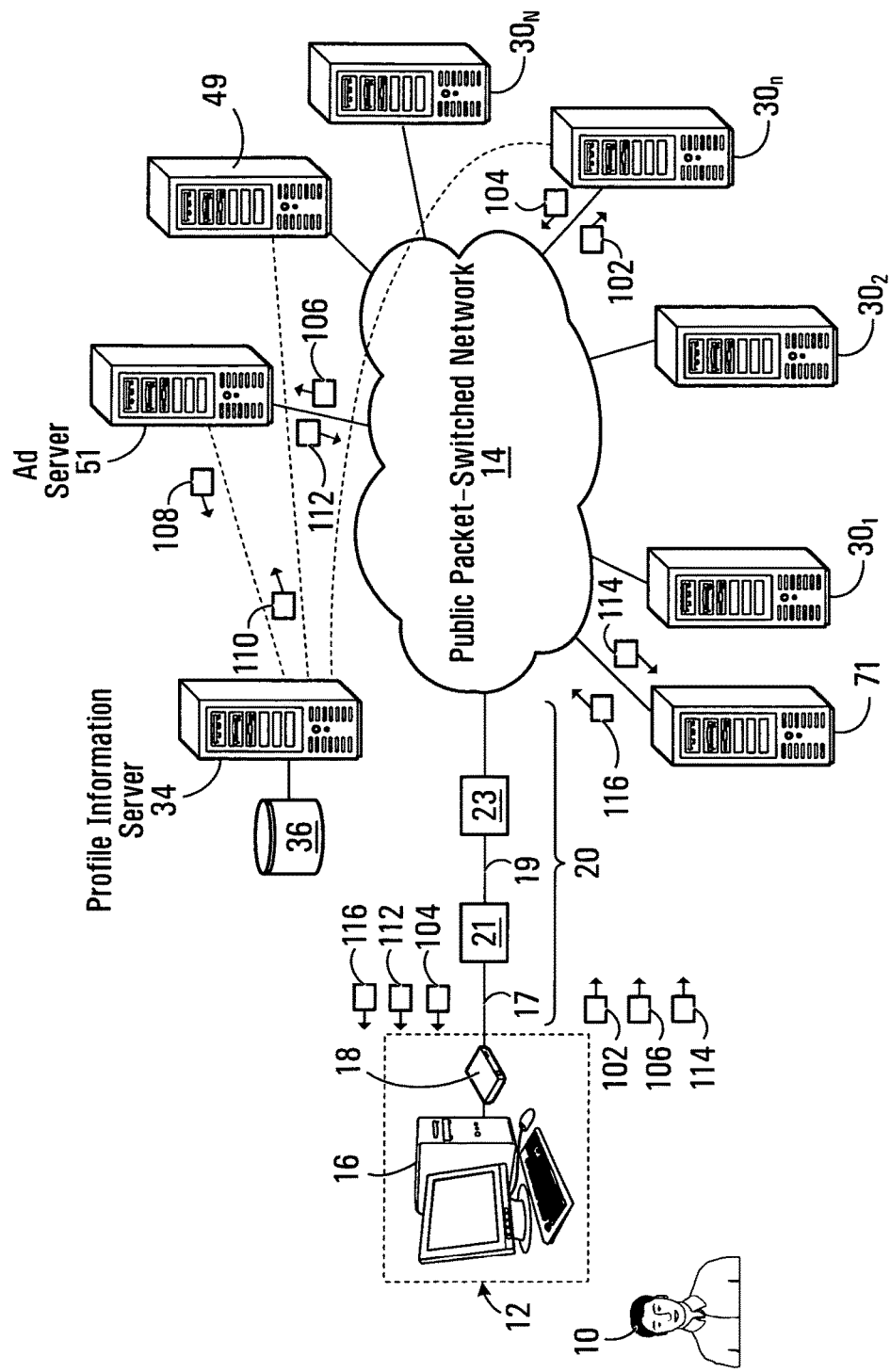
FIG. 3 shows an example of data exchanged between various components of the architecture shown in FIG. 1, in accordance with an embodiment of the present invention.

Referring to FIG. 3, the user 10 uses the computing device 16 of the communication apparatus 12 in order to access the network site implemented by the server $30_n$. This may involve the user 10 entering in the browser implemented by the computing device 16 a domain name that is associated with the network site implemented by the server $30_n$, or clicking on a hyperlink that is present on a page currently displayed by the browser and that identifies the network site implemented by the server $30_n$.

In response to this input by the user 10, the communication apparatus 12 proceeds to access the network site implemented by the server $30_n$. More particularly, possibly after interacting with a domain name server (DNS) to obtain a logical identifier (e.g., an IP address) associated with the server $30_n$, the communication apparatus 12 transmits data 102 to the server $30_n$. The data 102 conveys the logical identifier assigned to the communication apparatus 12 and serves to request online content associated with the network site implemented by the server $30_n$.

Upon receiving the data 102, the server $30_n$ processes it so as to cause the communication apparatus 12 to present online content elements associated with the network site implemented by the server $30_n$. For instance, the online content elements to be presented at the communication apparatus 12 may form a page of the network site implemented by the server $30_n$.

Thus, upon processing the data 102, and based on the logical identifier assigned to the communication apparatus 12, the server $30_n$ sends to the communication apparatus 12 data 104 to cause the communication apparatus 12 to present the online content elements associated with the network site implemented by the server $30_n$. More particularly, the data 104, when processed by the browser implemented by the computing device 16, enables the computing device 16 to present the online content elements associated with the network site implemented by the server $30_n$. For example, the data 104 may represent a hypertext markup language (HTML) file including portions (e.g., tags) that allow the browser implemented by the computing device 16 to present the online content elements associated with the network site implemented by the server $30_n$. In other examples, the data 104 may convey the online content elements themselves or redirect the browser implemented by the computing device 16 to another network site from which may be obtained the online content elements.

For purposes of this example, it is assumed that, in addition to one or more primary content elements of the network site implemented by the server $30_n$, the online content elements to be presented to the user 10 at the communication apparatus 12 include an advertising content element forming an online advertisement, where this online advertisement is to be selected by the ad server 51. As such, the data 104 conveys a pointer to the ad server 51 in order to allow the communication apparatus 12 to present the advertising content element forming the online advertisement to be selected by the ad server 51. On a basis of this pointer, the browser implemented by the computing device 16 sends data 106 to the ad server 51. The data 106 conveys the logical identifier assigned to the communication apparatus 12 and serves to request the advertising content element forming the online advertisement to be selected by the ad server 51.

Upon receiving the data 106, the ad server 51 processes it so as to determine the advertising content element forming the online advertisement to be presented at the communication apparatus 12. This determination may involve the ad server 51 selecting the online advertisement to be presented at the communication apparatus 12 from a number of available online advertisements. The ad server 51 may proceed to make this determination based on various factors, such as business rules or agreements between advertisers and an entity operating the network site implemented by the server 30$_n$, online behavior of the user 10 (i.e., behavioral targeting), a geographic location (e.g., a country or city) of the user 10, primary content of the network site implemented by the server 30$_n$ (i.e., contextual targeting), etc.

As part of its operation, and in accordance with an embodiment of the present invention, the ad server 51 interacts with the profile information server 34 in order to determine the online advertisement to be presented at the communication apparatus 12 based (at least in part) on certain information included in a profile that is associated with the logical identifier assigned to the communication apparatus 12 and that is in the profile information database 36. For purposes of this example, it is assumed that the certain information is a service point location of the communication apparatus 12, i.e., a location of a service point where a service provider provides a network access service to the user 10 of the communication apparatus 12. For example, the service point may be a house or other building (or an area thereof) in which the communication apparatus 12 is located, and the service point location may be expressed as a civic address, a set of geo-coordinates, or any other information specifying where this house or other building is located.

Thus, the ad server 51 proceeds to transmit data 108 to the profile information server 34. The data 108 conveys the logical identifier assigned to the communication apparatus 12 (and conveyed by the data 106) and serves to request from the profile information server 34 a service point location associated with this logical identifier, i.e., the service point location of the communication apparatus 12.

Upon receiving the data 108, the profile information server 34 processes it. More particularly, the profile information server 34 extracts the logical identifier assigned to the communication apparatus 12 and conveyed by the data 108, and consults the profile information database 36 in an attempt to find a particular one of the records $40_1 \ldots 40_M$ that corresponds to this logical identifier.

If the profile information server 34 is unable to find a particular one of the records $40_1 \ldots 40_M$ that corresponds to the logical identifier assigned to the communication apparatus 12 and conveyed by the data 108, the profile information server 34 may send to the ad server 51 data (not shown) indicating that no profile associated with this logical identifier, and thus no service point location included in such profile, can be found. Upon receiving this data, the ad server 51 may proceed to determine the online advertisement to be presented at the communication apparatus 12 based on other factors, without knowing the service point location of the communication apparatus 12.

For purposes of this example, assume that a particular one of the records $40_1 \ldots 40_M$ corresponds to the logical identifier assigned to the communication apparatus 12 and conveyed by the data 108. The profile information server 34 thus finds the particular one of the records $40_1 \ldots 40_M$, which associates the logical identifier assigned to the communication apparatus 12 (and conveyed by the data 108) to a profile including information known to the service provider involved in assigning the logical identifier to the communication apparatus 12. This information includes the service point location of the communication apparatus 12. Based on the data 108, which requests the service point location of the communication apparatus 12, the profile information server 34 obtains from the particular one of the records $40_1 \ldots 40_M$ the service point location of the communication apparatus 12.

The profile information server 34 proceeds to send data 110 to the ad server 51, the data 110 conveying the service point location of the communication apparatus 12. In some cases, the data 110 may be encrypted by the profile information server 34 prior to being transmitted to the ad server 51. This encryption may be effected using any suitable encryption technique (e.g., the Secure Socket Layer (SSL) protocol) by virtue of interaction between the profile information server 34 and the ad server 51.

Upon receiving the data 110, the ad server 51 processes the data 110 (possibly decrypting it) in order to obtain the service point location of the communication apparatus 12. On a basis of the service point location of the communication apparatus 12 and possibly other information (e.g., business rules or agreements between advertisers and the entity operating the network site implemented by the server 30*n*, the online behavior of the user 10, etc.), the ad server 51 proceeds to determine the advertising content element forming the online advertisement to be presented at the communication apparatus 12. That is, the ad server 51 uses the service point location of the communication apparatus 12 as a factor to determine the online advertisement to be presented at the communication apparatus 12.

For example, where the online advertisement to be presented at the communication apparatus 12 is to be selected from a number of available online advertisements for different stores, restaurants or other commercial establishments, the ad server 51 may select the online advertisement to be presented at the communication apparatus 12 such that it advertises the store, restaurant or other commercial establishment which is closest to the service point location of the communication apparatus 12. As another example, where the online advertisement to be presented at the communication apparatus 12 is to be selected from a number of available online advertisements for a company or a product or service offered thereby, the ad server 51 may select the online advertisement to be presented at the communication apparatus 12 such that it advertises the company, product or service along with a branch, authorized distributor or other place that provides the product or service and that is closest to the service point location of the communication apparatus 12. As yet another example, where the communication apparatus 12 is located at premises with a specific geographic condition, the ad server 51 may select the online advertisement to be presented at the communication apparatus 12 such that it advertises a product or service that is more likely to be of potential interest to a party (such as the user 10) located at a place with this specific geographic condition than to a party located at a place which does not have this specific geographic condition (e.g., where the communication apparatus 12 is located on a waterfront property, the ad server 51 may select the online advertisement to be presented at the communication apparatus 12 such that it advertises a boat, boating equipment or a service related to boats).

It will be appreciated that these examples are presented for illustrative purposes only as the ad server 51 can use the service point location of the communication apparatus 12 in various other ways to determine the online advertisement to be presented at the communication apparatus 12. It will also be appreciated that the service point location of the communication apparatus 12 may be one of several factors that are taken into consideration by the ad server 51 in determining the online advertisement to be presented at the communication apparatus 12.

Upon determining the online advertisement to be presented at the communication apparatus 12, the ad server 51 sends data 112 to the communication apparatus 12 to cause the communication apparatus 12 to present the advertising content element forming the online advertisement selected by the ad server 51. More particularly, the data 112, when processed by the browser implemented by the computing device 16, enables the computing device 16 to present the advertising content element forming the online advertisement selected by the ad server 51.

In one embodiment, the data 112 may represent a HTML file including a portion (e.g., a tag) that allows the browser implemented by the computing device 16 to present the advertising content element forming the online advertisement selected by the ad server 51. For instance, the HTML file may identify a location where resides data (e.g., a file or other document) representing the advertising content element that forms the online advertisement selected by the ad server 51. For purposes of this example, it is assumed that the data representing the advertising content element that forms the online advertisement selected by the ad server 51 resides on a network component 71 (e.g., a media or creative server). In some cases, the data representing the advertising content element that forms the online advertisement selected by the ad server 51 may reside on the ad server 51 or a component (e.g., a database) connected thereto. The online advertisement may be a banner ad, a vertical banner ad, a skyscraper ad, a pop-up ad, a pop-under ad, an interstitial ad, a floating ad, an expanding ad, a trick banner ad, a video ad, or any other type of online advertisement.

When it receives the data 112, the communication apparatus 12 processes the data 112 and identifies the network component 71 where resides the advertising content element that forms the online advertisement selected by the ad server 51. The communication apparatus 12 proceeds to send data 114 to the network component 71. The data 114 conveys the logical identifier assigned to the communication apparatus 12 and serves to request the advertising content element forming the online advertisement selected by the ad server 51.

Upon receiving the data 114, the network component 71 processes it and proceeds to transmit to the communication apparatus 12 data 116 representing the advertising content element forming the online advertisement selected by the ad server 51.

By processing the data 116 received from the network component 71 and the data 104 received from the server $30_n$, the browser implemented by the computing device 16 causes the display and/or one or more other output devices of the computing device 16 to present the online content elements associated with the network site implemented by the server $30_n$, including the one or more primary content elements of the network site implemented by the server $30_n$ and the online advertisement selected by the ad server 51.

It will thus be appreciated that, as the online advertisement presented to the user 10 is selected by the ad server 51 taking into account the service point location of the communication apparatus 12, this online advertisement may be targeted in a precise manner that is unachievable using other techniques. More particularly, as it is determined based on information known to the service provider involved in assigning the logical identifier to the communication apparatus 12, in this case, the service point location of the communication apparatus 12, the online advertisement presented to the user 10 may be targeted in terms of spatial location with a degree of precision that is much greater than that of other techniques. This may result in the online advertisement presented to the user 10 having a greater potential for being clicked on, selected or otherwise acted upon by the user 10 and, hence, having a greater effectiveness.

While the above-described example illustrates one possible manner of using the service point location included in the profile that is associated with the logical identifier assigned to the communication apparatus 12 (and that is in the profile information database 36) in order to determine the online advertisement to be presented at the communication apparatus 12, it will be appreciated that use of this service point location may be effected in various other manners in other embodiments.

Figure 4:
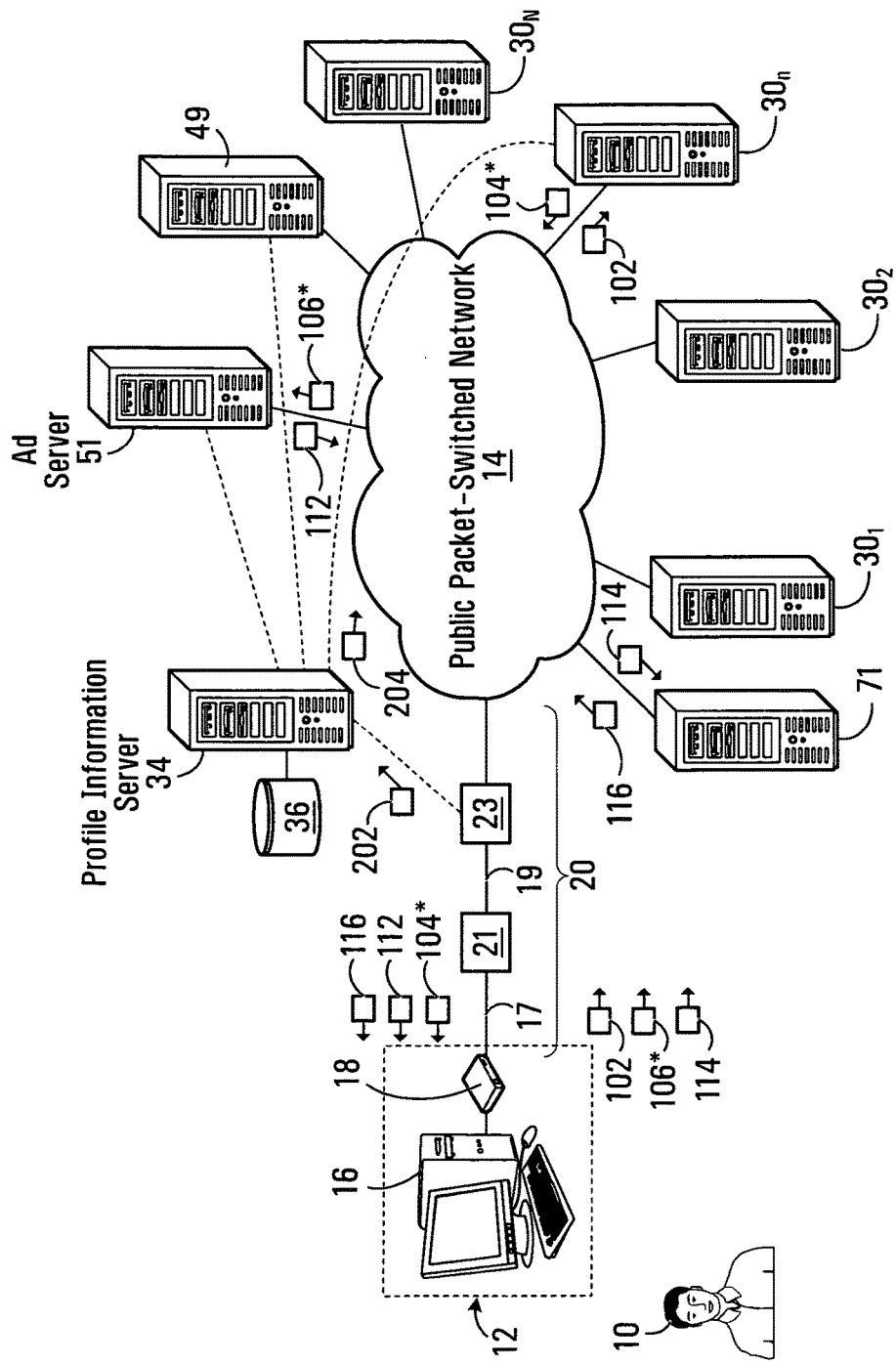
FIG. 4 shows an example of data exchanged between various components of the architecture shown in FIG. 1, in accordance with another embodiment of the present invention.

For example, FIG. 4 illustrates an alternative embodiment. In this embodiment, the network component 23 in the communication link 20 linking the communication apparatus 12 to the public packet-switched network 14 monitors network sites that are accessed by the communication apparatus 12.

As described in the previous example, in response to the user 10 using the computing device 16 to input information for accessing the network site implemented by the server $30_n$ (e.g., by entering in the browser implemented by the computing device 16 a domain name that is associated with the network site implemented by the server $30_n$, or clicking on a hyperlink that is present on a page currently displayed by the browser and that identifies the network site implemented by the server $30_n$), the communication apparatus 12 proceeds to access the network site implemented by the server $30_n$. More particularly, the communication apparatus 12 transmits the data 102 to the server $30_n$, the data 102 conveying the logical identifier assigned to the communication apparatus 12 and serving to request online content associated with the network site implemented by the server $30_n$. As the data 102 is destined for the server $30_n$, it also conveys as its destination a logical identifier (e.g., an IP address) associated with the server $30_n$.

In this example, based on the data 102 that passes therethrough, the network component 23, which monitors network sites that are accessed by the communication apparatus 12, detects that the communication apparatus 12 accesses the network site implemented by the server $30_n$. For purposes of this example, it is assumed that the network site implemented by the server $30_n$ is a trusted network site, i.e., a network site that is trusted by the service provider operating the network component 23. For instance, the network site implemented by the server $30_n$ may be owned, managed or otherwise controlled by a reputable or well-established company or other entity that is trusted by the service provider operating the network component 23. In some cases, this trust relationship may be established based on an agreement between the service provider operating the network component 23 and the entity controlling the network site implemented by the server $30_n$.

Upon determining that the network site implemented by the server $30_n$ is a trusted network site, the network component 23 proceeds to send data 202 to the profile information server 34. The data 202 conveys the logical identifier assigned to the communication apparatus 12 and the logical identifier associated with the network server $30_n$ (both conveyed by the data 102), and serves to command the profile information server 34 to transmit to the server $30_n$ certain information included in a profile that is associated with the logical identifier assigned to the communication apparatus 12 and that is in the profile information database 36. For purposes of this example, it is assumed that the certain information is the service point location of the communication apparatus 12.

Upon receiving the data 202, the profile information server 34 processes it. More particularly, the profile information server 34 extracts the logical identifier assigned to the communication apparatus 12 and conveyed by the data 202, and consults the profile information database 36 in an attempt to find a particular one of the records $40_1 \ldots 40_M$ that corresponds to this logical identifier.

If the profile information server 34 is unable to find a particular one of the records $40_1 \ldots 40_M$ that corresponds to the logical identifier assigned to the communication apparatus 12 and conveyed by the data 202, the profile information server 34 may send to the server $30_n$ data (not shown) indicating that no profile associated with this logical identifier, and thus no service point location included in such profile, can be found. Upon receiving this data, the server $30_n$ may proceed with its processing operations without knowing the service point location of the communication apparatus 12.

For purposes of this example, assume that a particular one of the records $40_1 \ldots 40_M$ corresponds to the logical identifier assigned to the communication apparatus 12 and conveyed by the data 202. The profile information server 34 thus finds the particular one of the records $40_1 \ldots 40_M$, which associates the logical identifier assigned to the communication apparatus 12 (and conveyed by the data 202) to a profile including information known to the service provider involved in assigning the logical identifier to the communication apparatus 12. This information includes the service point location of the communication apparatus 12. Based on the data 202, which specifies that the service point location of the communication apparatus 12 is to be transmitted to the server $30_n$, the profile information server 34 obtains from the particular one of the records $40_1 \ldots 40_M$ the service point location of the communication apparatus 12.

The profile information server 34 proceeds to send data 204 to the server $30_n$, the data 204 conveying the service point location of the communication apparatus 12. In some cases, the data 204 may be encrypted by the profile information server 34 prior to being transmitted to the server $30_n$. This encryption may be effected using any suitable encryption technique (e.g., SSL protocol) by virtue of interaction between the profile information server 34 and the server $30_n$.

Upon receiving the data 102 from the communication apparatus 12 and the data 204 from the profile information server 34, the server $30_n$ processes the data 102 and the data 204 (possibly decrypting it) so as to cause the communication apparatus 12 to present online content elements associated with the network site implemented by the server $30_n$. For instance, the online content elements to be presented at the communication apparatus 12 may form a page of the network site implemented by the server $30_n$.

Based on the logical identifier assigned to the communication apparatus 12, the server $30_n$ sends to the communication apparatus 12 data 104* to cause the communication apparatus 12 to present the online content elements associated with the network site implemented by the server $30_n$. More particularly, the data 104*, when processed by the browser implemented by the computing device 16, enables the computing device 16 to present the online content elements associated with the network site implemented by the server $30_n$. For example, the data 104* may represent a HTML file including portions (e.g., tags) that allow the browser implemented by the computing device 16 to present the online content elements associated with the network site implemented by the server $30_n$.

For purposes of this example, it is assumed that, in addition to one or more primary content elements of the network site implemented by the server $30_n$, the online content elements to be presented to the user 10 at the communication apparatus 12 include an advertising content element forming an online advertisement, where this online advertisement is to be selected by the ad server 51. As such, the data 104* conveys a pointer to the ad server 51 in order to allow the communication apparatus 12 to present the advertising content element forming the online advertisement to be selected by the ad server 51. Also, in this embodiment, the data 104* is generated by the server $30_n$ so that it conveys information dependent on the service point location of the communication apparatus 12. More specifically, in this embodiment, the information dependent on the service point location of the communication apparatus 12 is the service point location itself. In other embodiments, the information dependent on the service point location of the communication apparatus 12 may be other information that is included in the data 104* by the server $30_n$ on a basis of the service point location of the communication apparatus 12 (e.g., a code to be used by the ad server 51 in determining the online advertisement to be presented at the communication apparatus 12).

Upon receiving the data 104*, and using the pointer to the ad server 51 and the service point location of the communication apparatus 12 (both conveyed by the data 104*), the browser implemented by the computing device 16 sends data 106* to the ad server 51. The data 106* conveys the logical identifier assigned to the communication apparatus 12 and the service point location of the communication apparatus 12, and serves to request the advertising content element forming the online advertisement to be selected by the ad server 51.

Upon receiving the data 106*, the ad server 51 processes it so as to determine the advertising content element forming the online advertisement to be presented at the communication apparatus 12. This determination may involve the ad server 51 selecting the online advertisement to be presented at the communication apparatus 12 from a number of available online advertisements. The ad server 51 may proceed to make this determination based on various factors, such as business rules or agreements between advertisers and an entity operating the network site implemented by the server $30_n$, online behavior of the user 10 (i.e., behavioral targeting), a geographic location (e.g., a country) of the user 10, primary content of the network site implemented by the server $30_n$ (i.e., contextual targeting), etc.

More specifically, in this example, the ad server 51 proceeds to determine the advertising content element forming the online advertisement to be presented at the communication apparatus 12 based on the service point location of the communication apparatus 12 (conveyed by the data 106*) and possibly other information (e.g., business rules or agreements between advertisers and the entity operating the network site implemented by the server 30n, the online behavior of the user 10, etc.). That is, the ad server 51 uses the service point location of the communication apparatus 12 as a factor to determine the online advertisement to be presented at the communication apparatus 12.

For example, where the online advertisement to be presented at the communication apparatus 12 is to be selected from a number of available online advertisements for different stores, restaurants or other commercial establishments, the ad server 51 may select the online advertisement to be presented at the communication apparatus 12 such that it advertises the store, restaurant or other commercial establishment which is closest to the service point location of the communication apparatus 12. As another example, where the online advertisement to be presented at the communication apparatus 12 is to be selected from a number of available online advertisements for a company or a product or service offered thereby, the ad server 51 may select the online advertisement to be presented at the communication apparatus 12 such that it advertises the company, product or service along with a branch, authorized distributor or other place that provides the product or service and that is closest to the service point location of the communication apparatus 12. As yet another example, where the communication apparatus 12 is located at premises with a specific geographic condition, the ad server 51 may select the online advertisement to be presented at the communication apparatus 12 such that it advertises a product or service that is more likely to be of potential interest to a party (such as the user 10) located at a place with this specific geographic condition than to a party located at a place which does not have this specific geographic condition (e.g., where the communication apparatus 12 is located on a waterfront property, the ad server 51 may select the online advertisement to be presented at the communication apparatus 12 such that it advertises a boat, boating equipment or services related to boats).

It will be appreciated that these examples are presented for illustrative purposes only as the ad server 51 can use the service point location of the communication apparatus 12 in various other ways to determine the online advertisement to be presented at the communication apparatus 12. It will also be appreciated that the service point location of the communication apparatus 12 may be one of several factors that are taken into consideration by the ad server 51 in determining the online advertisement to be presented at the communication apparatus 12.

Upon determining the online advertisement to be presented at the communication apparatus 12, the ad server 51 sends data 112 to the communication apparatus 12 to cause the communication apparatus 12 to present the advertising content element forming the online advertisement selected by the ad server 51.

This example then proceeds as described above in connection with FIG. 3, leading to the browser implemented by the computing device 16 processing the data 116 received from the network component 71 and the data 104* received from the server 30$_n$, so as to cause the display and/or one or more other output devices of the computing device 16 to present the online content elements associated with the network site implemented by the server 30$_n$, including the one or more primary content elements of the network site implemented by the server 30$_n$ and the online advertisement selected by the ad server 51.

Although in the above-described examples an advertising content element forming an online advertisement to be presented at the communication apparatus 12 is determined based on the service point location of the communication apparatus 12, it will be appreciated that a primary content element of the network site implemented by the server 30$_n$ to be presented at the communication apparatus 12 may be determined by the server 30$_n$ (and/or the network component 49) using principles described herein. For example: where the network site provides an online map and/or directions feature, a primary content element conveying a current or starting point in the online map and/or directions feature may be presented at the communication apparatus 12 by the server 30$_n$ (or the network component 49) based on the service point location of the communication apparatus 12; where the network site provides a traffic update feature, a primary content element conveying a traffic level may be presented at the communication apparatus 12 by the server 30$_n$ (or the network component 49) based on the service point location of the communication apparatus 12; where the network site is a search engine site, a primary content element conveying search results may be presented at the communication apparatus 12 by the server 30$_n$ (or the network component 49) in response to a query made by the user 10, based on the service point location of the communication apparatus 12; etc. These examples are presented for illustrative purposes only as various other primary content elements of the network site implemented by the server 30$_n$ that are to be presented at the communication apparatus 12 may be determined by the server 30$_n$ (and/or the network component 49) using principles described herein.

In addition, while embodiments considered above relate to determining an online content element to be presented at the communication apparatus 12 based on the service point location of the communication apparatus 12, it is to be understood that, in other embodiments, one or more online content elements to be presented at the communication apparatus 12 may be determined by the server 30$_n$, the ad server 51 and/or the network component 49 based on other location information regarding the communication apparatus 12 which may be included in the profile that is associated with the logical identifier assigned to the communication apparatus 12 and that is contained in the profile information database 36. Also, in some embodiments, the location information that may be provided by the profile information server 34 to the server 30$_n$, the ad server 51 and/or the network component 49 may not be as precise as the service point location of the communication apparatus 12. For example, where the profile that is associated with the logical identifier assigned to the communication apparatus 12 and that is contained in the profile information database 36 includes location information specifying a civic address of a building or other site at which the communication apparatus 12 is located, the profile information server 34 may provide to the server 30$_n$, the ad server 51 and/or the network component 49 the civic address in its entirety or only a portion of the civic address (e.g., a city, a postal code, and/or a street). In some cases, the profile information server 34 may determine a level of precision of the location information to be provided to the server 30$_n$, the ad server 51 and/or the network component 49 based on a level of trust associated with the server 30$_n$, the ad server 51 and/or the network component 49.

Furthermore, while embodiments considered above relate to determining an online content element to be presented at the communication apparatus 12 based on location information regarding the communication apparatus 12, it is to be understood that, in other embodiments, one or more online content elements to be presented at the communication apparatus 12 may be determined by the server $30_n$, the ad server 51 and/or the network component 49 based on various other information included in the profile that is associated with the logical identifier assigned to the communication apparatus 12 and that is contained in the profile information database 36. For example, in some embodiments, an advertising content element forming an online advertisement to be presented at the communication apparatus 12 may be determined based on personal information (e.g., a name, gender, age, nationality, and/or correspondence language) included in the profile that is associated with the logical identifier assigned to the communication apparatus 12 and that is contained in the profile information database 36. This may result in the online advertisement presented to the user 10 being targeted in a personal manner and, thus, having a greater effectiveness. As another example, in some embodiments, an online content element to be presented at the communication apparatus 12 may be determined based on bandwidth information included in the profile that is associated with the logical identifier assigned to the communication apparatus 12 and that is contained in the profile information database 36 (e.g., present an online video if a bandwidth available to the communication apparatus 12 permits it or otherwise present another online content element, such as text or a picture, requiring less bandwidth). This may result in the online content presented to the user 10 being customized or otherwise tailored based on capacities of the communication apparatus 12, thereby enhancing the user's experience.

Also, although embodiments considered above relate to presenting at the communication apparatus 12 an online content element that may constitute a portion of an online page, it is to be understood that, in some embodiments, information included in the profile that is associated with the logical identifier assigned to the communication apparatus 12 and that is contained in the profile information database 36 may be used to present at the communication apparatus 12 an online content element that constitutes an entirety of an online page.

For example, in one embodiment, the network site implemented by the server $30_n$ may be a generic network site which, upon being accessed by the user 10 of the communication apparatus 12, causes presentation at the communication apparatus 12 of an online page that is determined based on certain information included in the profile that is associated with the logical identifier assigned to the communication apparatus 12 and that is contained in the profile information database 36. For instance, in some cases, the certain information may be the service point location of the communication apparatus 12. In some possible examples: the generic network site may be a taxi service site that is identified using a generic domain name (e.g., www.taxi.com) and that, upon being accessed by the communication apparatus 12, causes the communication apparatus 12 to present an online page that is associated with a specific taxi company that serves an area corresponding to the service point location of the communication apparatus 12; the generic network site may be a social networking site (e.g., a blog, a personal information sharing site such as Facebook®, etc.) that is identified using a generic domain name (e.g., www.neighborhoodblog.com) and that, upon being accessed by the communication apparatus 12, causes the communication apparatus 12 to present an online page directed to social networking content specific to an area corresponding to the service point location of the communication apparatus 12; the generic network site may be a site on elected representatives (e.g., members of a parliament or house of representatives) that is identified using a generic domain name (e.g., www.memberofparliament.com) and that, upon being accessed by the communication apparatus 12, causes the communication apparatus 12 to present an online page directed to a specific elected representative who is associated with an area corresponding to the service point location of the communication apparatus 12; etc.

It is to be understood that these examples are presented for illustrative purposes only as various other types of online pages to be presented at the communication apparatus 12 may be determined based on the service point location of the communication apparatus 12.

It is also to be understood that other information included in the profile that is associated with the logical identifier assigned to the communication apparatus 12 and that is contained in the profile information database 36 may be used to determine an online page to be presented at the communication apparatus 12 when the generic network site implemented by the server $30_n$ is accessed by the communication apparatus 12. For example, personal information (e.g., a name, gender, age, nationality, and/or correspondence language) included in the profile that is associated with the logical identifier assigned to the communication apparatus 12 and that is contained in the profile information database 36 may be used to determine an online page to be presented at the communication apparatus 12 when the generic network site implemented by the server $30_n$ is accessed by the communication apparatus 12. For instance, the generic network site may be an international company's site that, upon being accessed by the communication apparatus 12, causes the communication apparatus 12 to present an online page containing text in a language corresponding to the correspondence language specified in the profile that is associated with the logical identifier assigned to the communication apparatus 12 and that is contained in the profile information database 36. As another example, bandwidth information included in the profile that is associated with the logical identifier assigned to the communication apparatus 12 and that is contained in the profile information database 36 may be used to determine an online page to be presented at the communication apparatus 12 when the generic network site implemented by the server $30_n$ is accessed by the communication apparatus 12. For instance, the generic network site may, upon being accessed by the communication apparatus 12, cause the communication apparatus 12 to present an online page tailored or otherwise customized on a basis of a bandwidth available to the communication apparatus and specified in the profile that is associated with the logical identifier assigned to the communication apparatus 12 and that is contained in the profile information database 36.

In some cases, the online page presented at the communication apparatus 12 upon accessing the generic network site implemented by the server $30_n$ may be an online page delivered by the server $30_n$. In other cases, the online page presented at the communication apparatus 12 upon accessing the generic network site implemented by the server $30_n$ may be an online page delivered by another one of the servers $30_1 \ldots 30_N$ to which the communication apparatus 12 has been redirected by the server $30_n$.

While in embodiments previously considered herein certain data is exchanged between various components of the architecture depicted in FIG. 1, it will be appreciated that different data may be exchanged in other embodiments.

Also, while embodiments previously considered herein relate to online content delivered over the public packet-switched network 14, it will be recognized that principles described herein can be applied to online content delivered over a private packet-switched network.

Figure 5:
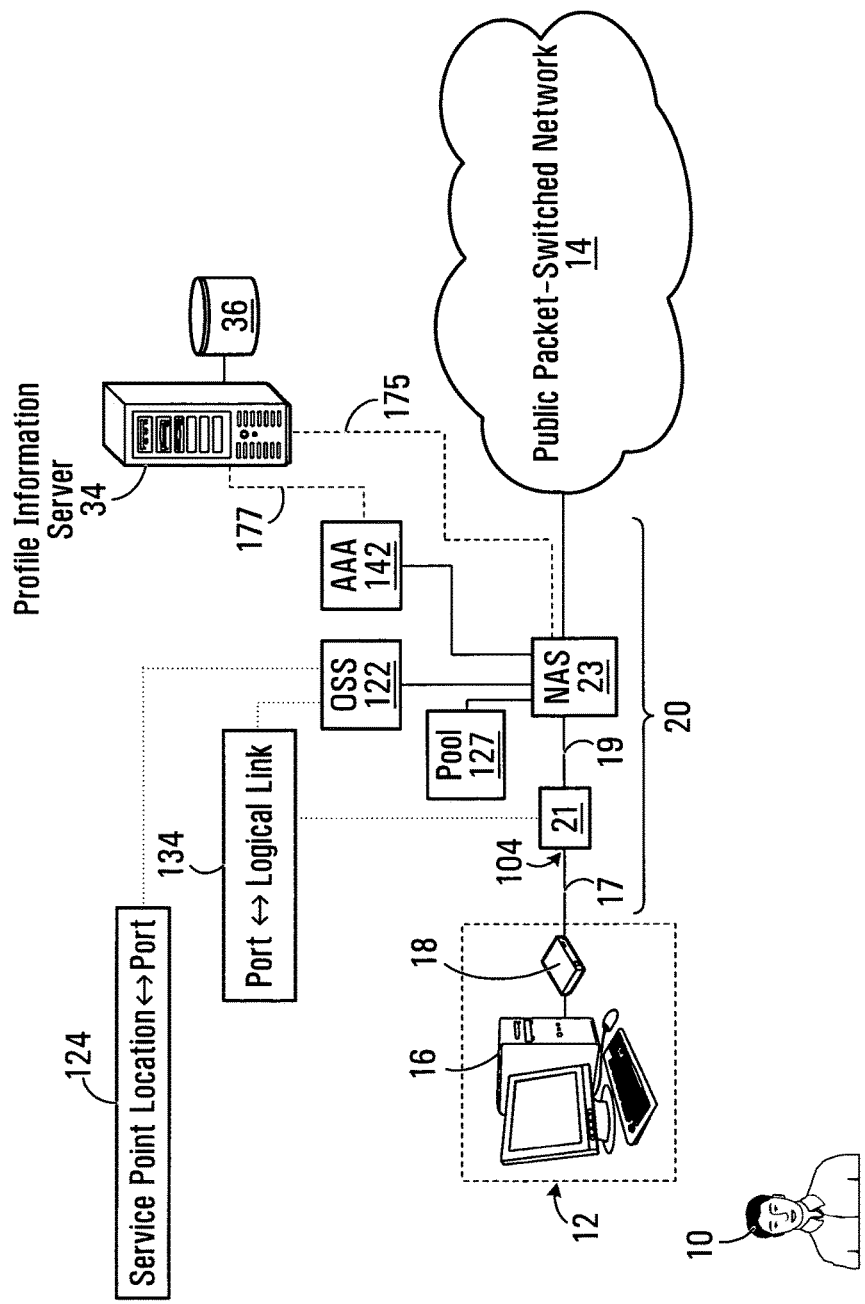
FIGS. 5 to 7 illustrate an example process by which the profile information database of the architecture shown in FIG. 1 may be populated, in accordance with an embodiment of the present invention.

Turning now to FIG. 5, an example process by which the profile information database 36 may be populated will be described. It is recalled that the profile information database 36 stores the records $40_1 \ldots 40_M$ that associate logical identifiers to profiles which include information known to one or more service providers involved in assigning these logical identifiers.

This example will illustrate one possible manner by which an association between the logical identifier assigned to the communication apparatus 12 and a profile including information known to a service provider involved in assigning the logical identifier to the communication apparatus 12, may be stored in the profile information database 36 as part of one of the records $40_1 \ldots 40_M$.

In this example, a given service provider owning, managing or otherwise associated with one or more network components of the communication link 20 connecting the communication apparatus 12 to the public packet-switched network 14 provides a network access service to a given party (who may or may not be the user 10) occupying, owning, managing or otherwise associated with premises where the communication apparatus 12 is located. In order to benefit from the network access service, the given party has a business relationship with the given service provider. As part of this business relationship, the given party interacts with the given service provider (e.g., during a registration or service activation phase) to provide personal information regarding itself. For example, this personal information may include a name, a gender, a date of birth or an age, a nationality, a correspondence language, a civic address (e.g., a residential or work address), a phone number (e.g., a residential, work, VoIP or mobile phone number), an email address, and/or an IM identifier of the given party. If the given party is more than one person, personal information regarding each such person may be provided. During interaction with the given service provider, the given party also indicates a service point location (e.g., a service address) where the network access service is to be delivered, selects a level of service to be obtained, provides billing information (e.g., a billing address and/or credit card information) to pay for the network access service, etc. Interaction between the given party and the given service provider may take place via a customer service representative of the given service provider or via a web site implemented by the given service provider.

The given service provider stores in the profile information database 36 a profile associated with the given party, in which is included information provided by the given party while interacting with the given service provider and possibly other information not obtained from the given party but pertaining to the network access service provided to the given party.

In this example, the infrastructure described above in connection with FIG. 1 comprises an operation support system (OSS) 122. The OSS 122 represents a collection of systems that perform management, inventory, engineering, planning, repair and other functions for the given service provider. In this light, one of the functions of the OSS 122 may include management of network components, assets and equipment. Thus, the OSS 122 maintains a mapping 124 between, on the one hand, ports of various access multiplexers or other network components under control of the given service provider and, on the other, service point locations of communication apparatuses (such as the communication apparatus 12) connected to those ports. In this case, the mapping 124 maintained by the OSS 122 relates a port 104 of the network component 21 to a service point location, i.e., the location of a service point where the communication apparatus 12 is located. As mentioned previously, this service point location may be expressed as a civic address, a set of geo-coordinates, or any other information identifying where the service point is located.

Also, in this example, the network component 21 of the communication link 20 connecting the communication apparatus 12 to the public packet-switched network 14 is an access multiplexer under control of the given service provider. In one embodiment, the access multiplexer 21 may be a DSLAM.

The access multiplexer 21 is connected to the network component 23, which, in this embodiment, is a network access server (NAS) operated by the given service provider. The NAS 23, which may also sometimes be referred to as a broadband remote access server (BRAS), a remote access server (RAS) or a broadband access server (BAS), provides access to the public packet-switched network 14. Communication between the access multiplexer 21 and the NAS 23 can take place over the dedicated logical link 19 between these elements. The dedicated logical link 19, which may traverse an intervening access data network (not shown), can be implemented in various ways. For example, in one embodiment, the dedicated logical link 19 may be implemented as an asynchronous transfer mode (ATM) permanent virtual circuit (PVC). In another embodiment, the dedicated logical link 19 may be implemented as a virtual local area network (VLAN). It will be appreciated that various other implementations of the dedicated logical link 19 are possible.

The access multiplexer 21 allows data arriving from the NAS 23 along given ATM PVCs, VLANs or other dedicated logical links to be sent over corresponding physical links via corresponding one of its ports, and vice versa. Thus, the access multiplexer 21 can be said to implement a mapping 134 between, on the one hand, dedicated logical links and, on the other, ports of the access multiplexer 21. In this example, the mapping 134 implemented by the access multiplexer 21 relates the dedicated logical link 19 to the port 104 of the access multiplexer 21. In two example embodiments, the mapping 134 can be maintained by either the access multiplexer 21 or the OSS 122.

The infrastructure shown in FIG. 5 further comprises an authorization component 142 connected to the NAS 23. The nature of the connection between the NAS 23 and the authorization component 142 is immaterial. For example, in one embodiment, the authorization component 142 may be a server (e.g., an Authentication, Authorization, and Accounting (AAA) server) responsive to queries from the NAS 23. In such an embodiment, the authorization component 142 and the NAS 23 may communicate using the Remote Authentication Dial In User Service (RADIUS) protocol, a description of which is available at www.ietf.org/rfc/rfc2865.txt. In another embodiment, the authorization component 142 may be a functional component integrated with the NAS 23.

In this example, the NAS 23 is operative to maintain a pool 127 of logical identifiers that can be used by various communication apparatuses, including the communication apparatus 12. In some embodiments, the pool 127 of addresses may be built up as a cooperative effort between the NAS 23 and the OSS 122, while in other embodiments, it may not be necessary for the OSS 122 to be involved in creating the pool 127 of logical identifiers. In still other embodiments, the pool 127 of logical identifiers may be maintained by the authorization component 142, and may be made accessible to the authorization component 142 without needing to pass through the NAS 23.

The profile information server 34, and the profile information database 36 that it has access to, can be linked to other components of the infrastructure of FIG. 5 in various ways. For example, in one embodiment, the profile information server 34 may be connected to the NAS 23 by a link 175. In another embodiment, the profile information server 34 may be connected to the authorization component 142 by a link 177. The nature of the connection between the profile information server 34 and either the NAS 23 or the authorization component 142 is immaterial. In other embodiments, the profile information server 34 may be part of either the OSS 122, the NAS 23 or the authorization component 142.

As previously mentioned, in some embodiments, the profile information server 34 and the profile information database 36 may be part of separate network components and communicatively coupled to one another via a communication link, which may traverse one or more network components and comprise one or more physical links and one or more logical links. In other embodiments, the profile information server 34 and the profile information database 36 may be part of a common network component. In yet other embodiments, the profile information database 36 may be distributed amongst a plurality of network components and/or physical locations. Also, it should be appreciated that the profile information database 36 may be managed, maintained and/or updated by an entity that may be the given service provider or a different entity.

It will be appreciated that numerous modifications and variations of the infrastructure of FIG. 5 are possible. For example, in some embodiments, the access multiplexer 21 can be omitted. This may be true in embodiments where the communication apparatus 12 implements a wireless access point. For instance, in such embodiments, the connection between the wireless access point and the NAS 23 may be provided by a dedicated point-to-point link. As another example, in some embodiments, instead of the dedicated logical link 19, there may be a shared link leading to the communication apparatus 12.

Figure 6:
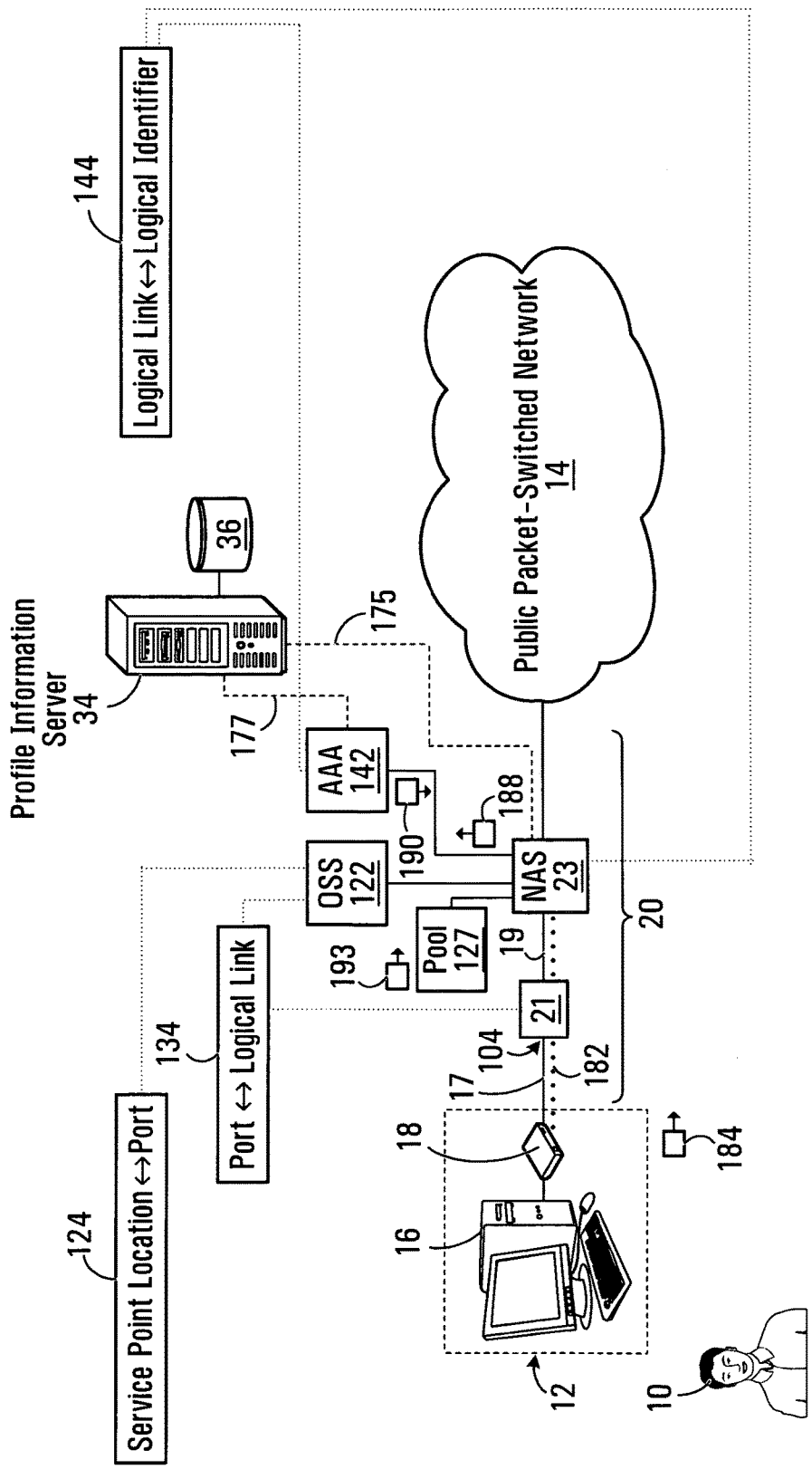

Reference is now made to FIG. 6, which illustrates an example of a possible event flow upon activation of the communication apparatus 12, which may occur, for instance, as the network interface unit 18 and/or the computing device 16 of the communication apparatus 12 is/are powered up. Thereafter:

The communication apparatus 12 establishes physical layer connectivity with the access multiplexer 21 over the physical link 17.

This is followed by establishment of Ethernet connectivity between the communication apparatus 12 and the access multiplexer 21.

The communication apparatus 12 verifies its ability to communicate using Point-to-Point Protocol over Ethernet (PPPoE). For a more detailed explanation of PPPoE, one may refer to Internet Request For Comments (RFC) 2516, available from the Internet Engineering Task Force (http://www.ietf.org), hereby incorporated by reference herein.

Next, assuming that the communication apparatus 12 has the ability to communicate using PPPoE, the communication apparatus 12 verifies whether it should make a so-called "access request" automatically or in response to user input (which can be obtained via a software application). For purposes of this example, let it be assumed that conditions have been met such that the communication apparatus 12 should make an access request.

The communication apparatus 12 begins entry into PPPoE communication by broadcasting an "initiation" packet over the dedicated logical link 19.

The NAS 23 responds to receipt of the initiation packet by sending an "offer" packet to the communication apparatus 12. Thus, at this stage, it can be said that a logical connection 182 has been defined between a first endpoint (the communication apparatus 12) and a second endpoint (the NAS 23).

Following receipt of the offer packet, the communication apparatus 12 sends an access request 184 to the NAS 23 with the ultimate goal of accessing the public packet-switched network 14. The access request 184 may comprise credentials that can be hard coded or programmably installed on the communication apparatus 12. Alternatively, the credentials may be entered by the user 10 of the communication apparatus 12.

Upon receipt of the access request 184 containing the credentials along the dedicated logical link 19, the NAS 23 executes an authorization procedure as follows. The NAS 23 communicates the credentials to the authorization component 142, e.g., via a RADIUS Access-Request message 188. In response to receipt of the credentials from the NAS 23, the authorization component 142 determines whether the credentials allow access to the public packet-switched network 14. For example, this can be determined by consulting a database (not shown). If the credentials allow access to the public packet-switched network 14, the authorization component 142 returns an acceptance message (e.g., a RADIUS Access-Accept message). On the other hand, if the credentials do not allow access to the public packet-switched network 14, the authorization component 142 returns a refusal message (e.g., a RADIUS Access-Reject message). For purposes of this example, assume that the credentials allow access to the public packet-switched network 14, resulting in issuance of an acceptance message 190. In this example, two alternatives are possible:

Alternative 1 (where the pool 127 of logical identifiers is maintained by the authorization component 142): the authorization component 142 obtains a logical identifier 193 from the pool 127 of logical identifiers that is maintained by the authorization component 142. The logical identifier 193 is sent to the NAS 23, which assigns the logical identifier 193 to the dedicated logical link 19.

Alternative 2 (where the pool 127 of logical identifiers is maintained by the NAS 23): responsive to receipt of the acceptance message 190 from the authorization component 142, the NAS 23 obtains a logical identifier 193 from the pool 127 of logical identifiers that is maintained by the NAS 23. The logical identifier 193 so obtained is assigned by the NAS 23 to the dedicated logical link 19.

The NAS 23 sends a "confirmation" packet back to the communication apparatus 12, thus completing establishment of a PPPoE session between the endpoints of the logical connection 182.

Additional hand-shaking may be performed between the communication apparatus 12 and the NAS 23 in order to establish a Point-to-Point Protocol (PPP) session between the endpoints of the logical connection 182.

Following this, further hand-shaking may be undertaken between the communication apparatus 12 and the NAS 23 in order to establish an Internet Protocol Control Protocol (IPCP) session between the endpoints of the logical connection 182.

During the IPCP session, the NAS 23 releases the logical identifier 193 towards the communication apparatus 12 that issued the access request 184, in order to allow the communication apparatus 12 to identify itself using the logical identifier 193 in future communications over the dedicated logical link 19. Since the dedicated logical link 19 to which has been assigned the logical identifier 193 leads to the communication apparatus 12 and since the communication apparatus 12 will identify itself using the logical identifier 193 in future communications, it can be seen that the logical identifier 193 is in essence assigned to the communication apparatus 12.

It is recalled that once the logical identifier 193 has been obtained from the pool 127 of logical identifiers (either by the NAS 23 or by the authorization component 142), the NAS 23 assigns the logical identifier 193 to the dedicated logical link 19.

In an embodiment where the profile information server 34 is connected to the NAS 23 by the link 175, the fact that the NAS 23 assigns the logical identifier 193 to the dedicated logical link 19 allows the NAS 23 to construct and maintain a mapping 144 between, on the one hand, various dedicated logical links (such as the dedicated logical link 19 and others) and, on the other, logical identifiers corresponding to those dedicated logical links.

In an embodiment where the profile information server 34 is connected to the authorization component 142 by the link 177, the logical identifier 193 and the identity of the dedicated logical link 193 to which it is assigned are sent back by the NAS 23 to the authorization component 142, and it is the authorization component 142 that maintains the aforementioned mapping 144 between dedicated logical links and logical identifiers corresponding to those dedicated logical links.

Of course, those skilled in the art will be able to think of other ways of causing the communication apparatus 12 to send the access request 184 over the logical connection 182 between the communication apparatus 12 and the NAS 23, as well as other ways of assigning a logical identifier to the dedicated logical link 19 and thus to the communication apparatus 12. It should further be mentioned that, in some cases, the establishment of the aforementioned PPPoE, PPP and/or IPCP sessions may not be required. This is particularly the case where the dedicated logical link 19 is a VLAN.

In view of the preceding description, and in particular given the previously described mappings 124, 134 maintained in the OSS 122 and/or the access multiplexer 21 and the mapping 144 maintained in the NAS 23 or the authorization component 142, the following describes how one can create an association between logical identifiers and service point locations.

Figure 7:
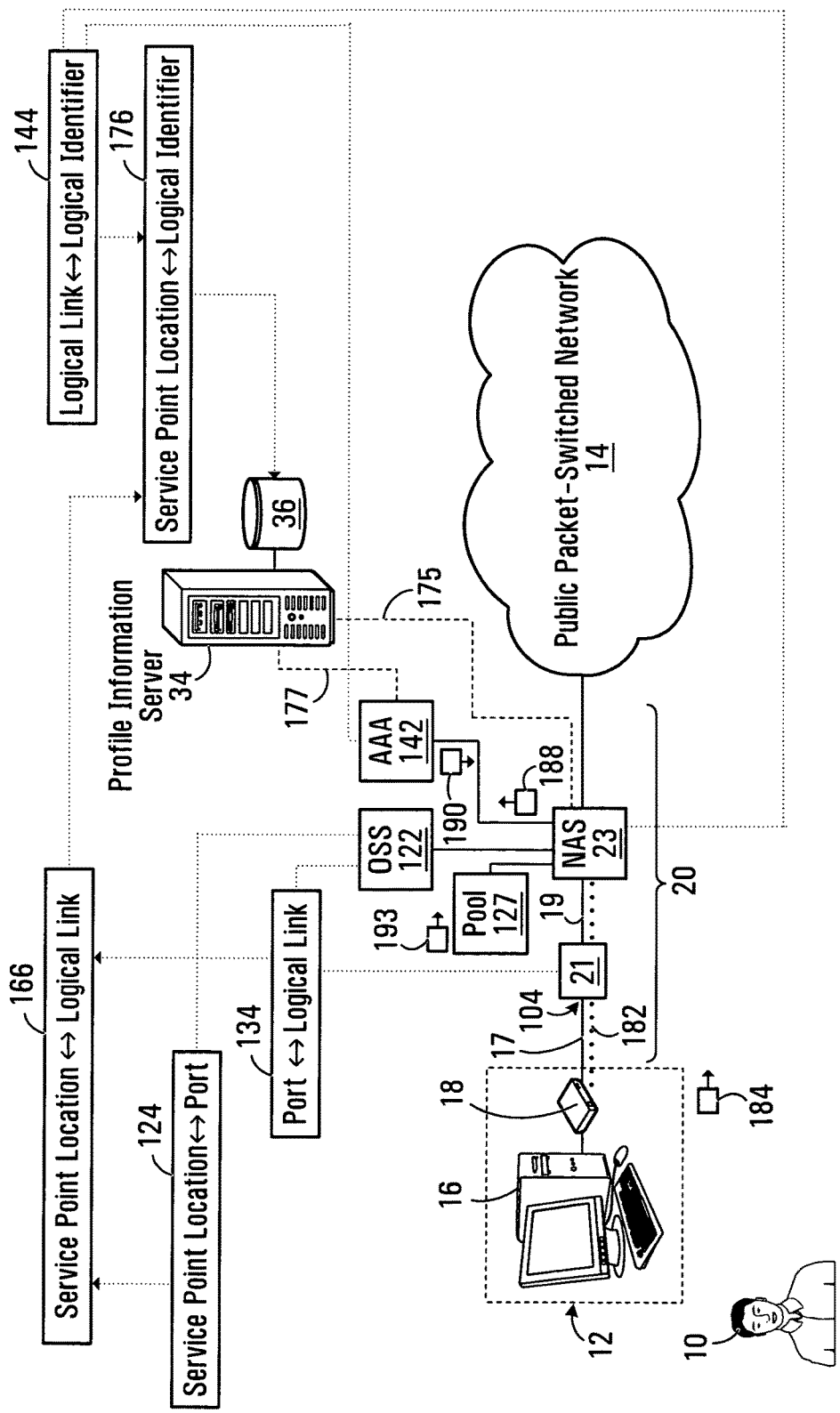

Specifically, with reference to FIG. 7, by combining the mapping 124 with the mapping 134, the OSS 122 can create an intermediate mapping 166 between, on the one hand, dedicated logical links and, on the other hand, service point locations of communication apparatuses having logical connections with the NAS 23 which traverse those dedicated logical links. In this example, the intermediate mapping 166 would associate the dedicated logical link 19 to the service point location of the communication apparatus 12. In one embodiment, the OSS 122 transmits the intermediate mapping 166 to the profile information server 34.

Next, the profile information server 34 may be operative to combine the intermediate mapping 166 (received from the OSS 122) with the aforementioned mapping 144 (received from the NAS 23 or the authorization component 142), thus creating a final mapping 176 between, on the one hand, logical identifiers and, on the other, service point locations of communication apparatuses having logical connections with the NAS 23 which traverse respective dedicated logical links to which those logical identifiers have been assigned. In this example, the final mapping 176 would specify that the logical identifier 193 corresponds to the service point location of the communication apparatus 12, i.e., the location of the service point where the communication apparatus 12 is located.

It is recalled that the profile associated with the given party and stored in the profile information database 36 by the given service provider includes the service point location where the network access service is to be delivered to the given party. Thus, based on the final mapping 176 specifying that the logical identifier 193 corresponds to the service point location of the communication apparatus 12, the profile information server 34 associates, in the profile information database 36, the profile associated with the given party to the logical identifier 193 assigned to the communication apparatus 12.

From the above, it should be apparent that the profile information database 36 can be populated with logical identifiers and profiles associated with these logical identifiers.

While the above-described example illustrates one possible technique for populating the profile information database 36, it will be appreciated that other techniques may be employed in other embodiments. For example, in some embodiments, the aforementioned credentials, which may be hard coded or programmably installed on the communication apparatus 12 or entered by the user 10 of the communication apparatus and which may be included in the access request 184 sent by the communication apparatus 12 to the NAS 23, can be used to associate the logical identifier 193 assigned to the communication apparatus 12 to the profile associated with the given party and stored in the profile information database 36. Specifically, these credentials, which are known by the service provider to have been provided to the given party, may be linked by the given service provider to the profile associated with the given party. Upon receiving the credentials as part of the access request 184 and assigning the logical identifier 193 to the communication apparatus 12, the given service provider may associate, in the profile information database 36, the profile associated with the given party to the logical identifier 193 assigned to the communication apparatus 12.

It will also be appreciated that, in embodiments where the logical identifier is dynamically assigned to the communication apparatus 12 (e.g., a dynamic IP address), the profile information database 36 may be updated accordingly.

Although in embodiments described above the communication apparatus 12 is directly connected to the communication link 20, it will be appreciated that, in some embodiments, the communication apparatus 12 may be connected to a router that is connected to the communication link 20 and that may be connected to one or more other communication apparatuses at premises where the communication apparatus 12 is located. In such embodiments, the router may perform network address translation (NAT) for packets passing therethrough. Depending on the type of NAT performed, in some cases, the logical identifier assigned to the communication apparatus 12 may include a portion identifying the router and a portion identifying the communication apparatus 12 connected thereto. For instance, the logical identifier assigned to the communication apparatus 12 may include an IP address assigned to the router, as well as a port number of a port of the router to which is connected the communication apparatus 12 or a local IP address assigned to the communication apparatus 12 by the router.

Also, while in embodiments considered above the profile information server 34 interacts with the server 30$_n$, the ad server 51 and/or the network component 49 using the information included in the particular one of the records 40$_1$ . . . 40$_M$ in the profile information database 36 without the user 10 being explicitly informed of this fact, in other embodiments there may be mechanisms to notify the user 10 of this fact or confirm with the user 10 that he/she allows this information to be used by the profile information server 34 in its interaction with the server 30$_n$, the ad server 51 and/or the network component 49. For example, in some embodiments, an applet, widget or other suitable element may be implemented to notify the user 10 via the computing device 16 (e.g., via a pop-up window) of the interaction between the profile information server 34 and the server 30$_n$, the ad server 51 and/or the network component 49, and possibly to allow the user 10 to confirm whether information (or control which information) included in the particular one of the records 40$_1$ . . . 40$_M$ in the profile information database 36 can be used by the profile information server 34 as part of this interaction. As another example, the given party (who may or may not be the user 10) occupying, owning, managing or otherwise associated with premises where the communication apparatus 12 is located may have previously authorized the service provider providing the network access service to the communication apparatus 12 (e.g., during a registration phase) to use information contained in the particular one of the records 40$_1$ . . . 40$_M$ in order to facilitate determination of one or more online content elements to be presented at the communication apparatus 12 when the communication apparatus 12 is used to access or interact with network sites implemented by the servers 30$_1$ . . . 30$_N$.

In addition, while in embodiments considered above information included in the profile that is associated with the logical identifier assigned to the communication apparatus 12 and that is contained in the profile information database 36 is used in determining online content elements to be presented at the communication apparatus 12 when the user 10 uses the browser implemented by the computing device 16 to access and interact with network sites implemented by the servers 30$_1$ . . . 30$_N$, principles discussed herein can be applied to determine online content elements to be presented at the communication apparatus 12 when the user 10 uses other software applications that are implemented by the computing device 16 and that exchange data over the packet-switched network 14 (e.g., an IM client having a window presenting online advertisements to the user 10).

Furthermore, while in embodiments considered above the profile information database 36 maintains an association between (1) logical identifiers (e.g., IP addresses) assigned to communication apparatuses (such as the communication apparatus 12) to enable the communication apparatuses to exchange data over the packet-switched network 14, and (2) profiles including information known to one or more service providers involved in assigning these logical identifiers, it is to be understood that, in other embodiments, other identifiers may be assigned to the communication apparatuses and associated with the profiles in the profile information database 36. In particular, in some embodiments, the profile information database 36 may associate the profiles with particular identifiers that are assigned to the communication apparatuses but that are not used by the communication apparatuses to exchange data over the packet-switched network 14. In these embodiments, the particular identifiers are designed specifically to identify their associated profiles in the profile information database 36 and can be referred to as "profile identifiers". In that sense, each profile identifier acts as a "key" which, upon being received by the profile information server 34, allows the profile information server 34 to consult the profile information database 36 and identify the profile associated with that profile identifier.

In such embodiments, a profile identifier may be assigned to a communication apparatus in a manner similar to that employed to assign a logical identifier to that communication apparatus. For example, a profile identifier may be assigned to the communication apparatus 12 using techniques similar to those employed to assign the logical identifier 193 to the communication apparatus 12. More particularly, the profile identifier may be assigned to the communication apparatus 12 by a network component that is part of the communication link 20 (e.g., the NAS 23), when the communication apparatus 12 is activated (e.g., when the network interface unit 18 and/or the computing device 16 is/are powered-up) or otherwise regains network connectivity or at any other suitable time. The network component releases the profile identifier towards the communication apparatus 12, which proceeds to store it in memory for future use. Release of the profile identifier towards the communication apparatus 12 may occur before, concurrently with, or after release of the logical identifier 193 to the communication apparatus 12. Once it is stored in the communication apparatus 12, the profile identifier may be retrieved and used by the profile information server 34 to access information contained in the profile information database 36 using principles discussed herein.

Those skilled in the art will appreciate that, in some embodiments, certain functionality of a given component described herein (e.g., the profile information server 34, the server 30$_n$, the ad server 51 and/or the network component 49) may be implemented as pre-programmed hardware or firmware elements (e.g., application specific integrated circuits (ASICs), electrically erasable programmable read-only memories (EEPROMs), etc.) or other related elements. In other embodiments, a given component described herein (e.g., the profile information server 34, the server 30$_n$, the ad server 51 and/or the network component 49) may comprise a processor having access to a code memory which stores program code (e.g., instructions) for operation of the processor to implement functionality of that given component. The program code may be stored on a medium which is fixed, tangible, and readable directly by the given component (e.g., removable diskette, CD-ROM, ROM, fixed disk, USB key, etc.). Alternatively, the program code may be stored remotely but transmittable to the given component via a modem or other interface device connected to a network over a transmission medium. The transmission medium may be either a tangible medium (e.g., optical or analog communications lines) or a medium implemented using wireless techniques (e.g., RF, microwave, infrared or other wireless transmission schemes).

Although various embodiments of the present invention have been described and illustrated, it will be apparent to those skilled in the art that numerous modifications and variations can be made without departing from the scope of the invention, which is defined in the appended claims.

The invention claimed is:

1. A system for presenting online content at a communication apparatus, the communication apparatus using a network access service provided by a service provider to exchange data over a packet-switched network, said system comprising:
   a network access component capable of providing network access to at least one device including the communication apparatus; and
   a profile information server;
   wherein the network access component is configured for:
      detecting that the communication apparatus accesses a particular website; and
      sending, in response to the detecting, an identifier of the communication apparatus and an identifier of the particular website to the profile information server; and
   wherein the profile information server is configured for:
      (i) consulting a database on a basis of the identifier of the communication apparatus received from the network access component to determine bandwidth information regarding a bandwidth provided to the communication apparatus by the service provider, and
      (ii) sending the bandwidth information to the particular website, thereby to trigger the particular website to determine an online content element at least in part on a basis of the bandwidth information for presentation at the communication apparatus.

2. A system as claimed in claim 1, wherein the network access component is further configured for determining whether the particular website is a trusted website and wherein the network access component is configured for carrying out the sending only if the particular website is determined to be a trusted website.

3. A system as claimed in claim 1, wherein the profile information server sends the bandwidth information to the particular website over the packet-switched network.

4. A system as claimed in claim 3, wherein the profile information server is further configured for encrypting the bandwidth information before sending it over the packet-switched network.

5. A system as claimed in claim 1, wherein the network access component comprises one of a network access server (NAS) and a router.

6. A system as claimed in claim 1, wherein the identifier of the communication apparatus comprises an Internet Protocol address.

7. A system as claimed in claim 1, wherein the identifier of the communication apparatus comprises a profile identifier not required by the communication apparatus to exchange data over the packet-switched network.

8. A system as claimed in claim 1, wherein the profile information server is configured for determining location information regarding the communication apparatus based on the identifier of the communication apparatus, and for sending the location information to the particular website.

9. A system as claimed in claim 8, wherein the location information includes a service point location of the communication apparatus.

10. A system as claimed in claim 1, wherein the profile information server is configured for determining personal information regarding the communication apparatus based on the identifier of the communication apparatus, and for sending the personal information to the particular website.

11. A system as claimed in claim 10, wherein the personal information comprises at least one of: a name, a gender, a date of birth or an age, a nationality, a correspondence language, a civic address, a phone number, an email address, an instant messaging identifier, and financial information.

12. A method for presenting online content at a communication apparatus, the communication apparatus using a network access service provided by a service provider to exchange data over a packet-switched network, said method comprising:
   at a network access component capable of providing network access to at least one device including the communication apparatus, detecting that the communication apparatus accesses a particular website;
   in response to the detecting, sending an identifier of the communication apparatus and an identifier of the particular website to a profile information server;
   at the profile information server, consulting a database on a basis of the identifier of the communication apparatus received from the network access component to determine bandwidth information regarding a bandwidth provided to the communication apparatus by the service provider; and
   sending the bandwidth information to the particular website, thereby to trigger the particular website to determine an online content element at least in part on a basis of the bandwidth information for presentation at the communication apparatus.

13. A method as claimed in claim 12, further comprising determining whether the particular website is a trusted website and wherein the sending is carried out only if the particular website is determined to be a trusted website.

14. A method as claimed in claim 12, wherein the bandwidth information is sent to the particular website over the packet-switched network.

15. A method as claimed in claim 14, further comprising encrypting the bandwidth information before sending it over the packet-switched network.

16. A method as claimed in claim 12, wherein the identifier of the communication apparatus comprises an Internet Protocol address.

17. A method as claimed in claim 12, wherein the identifier of the communication apparatus comprises a profile identifier not required by the communication apparatus to exchange data over the packet-switched network.

18. A method as claimed in claim 12, further comprising, at the profile information server, determining location information regarding the communication apparatus based on the identifier of the communication apparatus, and sending the location information to the particular website.

19. A method as claimed in claim 18, wherein the location information includes a service point location of the communication apparatus.

20. A method as claimed in claim 12, further comprising, at the profile information server, determining personal information regarding the communication apparatus based on the identifier of the communication apparatus, and sending the personal information to the particular website.

21. A method as claimed in claim 20, wherein the personal information comprises at least one of: a name, a gender, a date of birth or an age, a nationality, a correspondence language, a civic address, a phone number, an email address, an instant messaging identifier, and financial information.

* * * * *